US012366517B2

(12) United States Patent
Klassen et al.

(10) Patent No.: US 12,366,517 B2
(45) Date of Patent: Jul. 22, 2025

(54) LIGHT DETECTION SYSTEMS HAVING FIRST AND SECOND LIGHT RECEIVERS, AND METHODS OF USE THEREOF

(71) Applicant: Becton, Dickinson and Company, Franklin Lakes, NJ (US)

(72) Inventors: Andrew Saul Klassen, San Jose, CA (US); Jason Bradley Ersepke, San Jose, CA (US); Jorge Manzarraga, Sunnyvale, CA (US); Mark Dorighi, Fremont, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 308 days.

(21) Appl. No.: 17/870,187

(22) Filed: Jul. 21, 2022

(65) Prior Publication Data
US 2023/0037799 A1 Feb. 9, 2023

Related U.S. Application Data

(60) Provisional application No. 63/229,163, filed on Aug. 4, 2021.

(51) Int. Cl.
*G01N 15/1434* (2024.01)
*G01J 1/44* (2006.01)
(Continued)

(52) U.S. Cl.
CPC .......... *G01N 15/1434* (2013.01); *G01J 1/44* (2013.01); *G01J 3/0202* (2013.01); *G01J 3/0286* (2013.01);
(Continued)

(58) Field of Classification Search
CPC .......... G01N 15/1434; G01N 15/1436; G01N 15/10; G02B 27/141; G02B 27/145;
(Continued)

(56) References Cited

U.S. PATENT DOCUMENTS 673,418 A * 5/1901 Burry .................. G01B 9/02
356/451
4,690,561 A 9/1987 Ito
(Continued)

FOREIGN PATENT DOCUMENTS

CN 105420091 3/2016
CN 110161003 8/2019
(Continued)

OTHER PUBLICATIONS

S. Dearden,'Theoretical Parameters for the Design of a 'Classical' Spectrograph'. https://web.archive.org/web/20030224185029/www.astrosurf.com/buil/us/stage/calcul/design_us.htm (Year: 2003) (Year: 2003).*

(Continued)

*Primary Examiner* — Dominic J Bologna
(74) *Attorney, Agent, or Firm* — Bret E. Field; BOZICEVIC, FIELD & FRANCIS LLP

(57) ABSTRACT

Light detection systems are provided. Aspects of the light detection systems include first and second light receivers in fixed positions relative to each other, a plurality of wavelength separators configured to pass light from the first and second light receivers having a predetermined spectral range, and a plurality of light detection modules. Baseplates having a stage for mounting a light receiver, a plurality of recesses for fixing a plurality of light detection modules in rigid alignment relative to the stage, and a heat dissipation opening positioned within each recess are also provided. In addition, particle analysis systems, methods and kits for practicing the invention are disclosed.

20 Claims, 27 Drawing Sheets

(51) Int. Cl.

| | |
|---|---|
| *G01J 3/02* | (2006.01) |
| *G01J 3/10* | (2006.01) |
| *G01J 3/12* | (2006.01) |
| *G01J 3/14* | (2006.01) |
| *G01J 3/36* | (2006.01) |
| *G01N 15/10* | (2024.01) |
| *G01N 15/14* | (2024.01) |
| *G01N 15/1404* | (2024.01) |
| *G01N 15/1492* | (2024.01) |
| *G01N 21/64* | (2006.01) |

(52) U.S. Cl.
CPC ............ *G01J 3/0291* (2013.01); *G01J 3/10* (2013.01); *G01J 3/14* (2013.01); *G01J 3/36* (2013.01); *G01N 15/1404* (2013.01); *G01N 15/1436* (2013.01); *G01N 15/1459* (2013.01); *G01N 15/1492* (2024.01); *G01N 21/645* (2013.01); *G01J 2001/4466* (2013.01); *G01J 2003/104* (2013.01); *G01J 2003/1265* (2013.01); *G01N 2015/1006* (2013.01); *G01N 2015/1402* (2013.01); *G01N 2021/6421* (2013.01)

(58) Field of Classification Search
CPC ... G02B 27/1013; G02B 27/10; G01J 3/0291; G01J 3/0202; G01J 2001/4466
See application file for complete search history.

(56) References Cited

U.S. PATENT DOCUMENTS

| | | | |
|---|---|---|---|
| 5,408,307 A | 4/1995 | Yamamoto | |
| 5,422,712 A | 6/1995 | Ogino | |
| 5,684,575 A | 11/1997 | Steen | |
| 5,995,235 A * | 11/1999 | Sui | G01N 21/71 |
| | | | 250/226 |
| 6,198,864 B1 | 3/2001 | Lemoff et al. | |
| 6,249,348 B1 | 6/2001 | Jung et al. | |
| 6,362,888 B1 | 3/2002 | Jung et al. | |
| 6,461,058 B1 | 10/2002 | Birch et al. | |
| 6,490,038 B1 | 12/2002 | Jung et al. | |
| 6,683,314 B2 * | 1/2004 | Oostman, Jr. et al. | |
| | | | G01N 21/64 |
| | | | 250/461.2 |
| 6,870,165 B2 | 3/2005 | Amirkhanian et al. | |
| 6,870,976 B2 | 3/2005 | Chen et al. | |
| 6,873,418 B1 * | 3/2005 | Howey | G01B 9/02 |
| | | | 356/451 |
| 7,038,778 B2 | 5/2006 | Yamauchi | |
| 7,129,505 B2 * | 10/2006 | Oostman, Jr. | G01J 3/0202 |
| | | | 250/458.1 |
| 7,466,419 B2 | 12/2008 | Yamauchi et al. | |
| 7,623,243 B2 | 11/2009 | Kato | |
| 7,990,525 B2 | 8/2011 | Kanda | |
| 8,149,402 B2 * | 4/2012 | Rich | G01N 21/53 |
| | | | 436/36 |
| 8,284,402 B2 | 10/2012 | Frazier et al. | |
| 8,488,244 B1 | 7/2013 | Li | |
| 8,599,487 B2 | 12/2013 | Von Elm et al. | |
| 9,157,791 B2 | 10/2015 | Heimbuch et al. | |
| 9,772,274 B2 | 9/2017 | Graham et al. | |
| 9,957,554 B1 | 5/2018 | Wu et al. | |
| 10,187,175 B2 | 1/2019 | Iwasaki | |
| 11,821,830 B2 * | 11/2023 | Ilkov | G01N 15/14 |
| 11,959,847 B2 * | 4/2024 | Sharpe | G01N 15/0211 |
| 2002/0071121 A1 | 6/2002 | Otyn | |
| 2002/0118362 A1 | 8/2002 | Saccomanno | |
| 2003/0048539 A1 | 3/2003 | Oostman et al. | |
| 2004/0070765 A1 | 4/2004 | Yamaguchi | |
| 2004/0161143 A1 | 8/2004 | Dietz et al. | |
| 2005/0201501 A1 | 4/2005 | Belotserkovsky et al. | |
| 2005/0151964 A1 * | 7/2005 | Roth | G01N 21/64 |
| | | | 356/318 |
| 2006/0102828 A1 | 5/2006 | Furusato et al. | |
| 2006/0134003 A1 | 6/2006 | Georgakoudi et al. | |
| 2009/0121154 A1 | 5/2009 | Westphal et al. | |
| 2009/0201501 A1 | 8/2009 | Westphal et al. | |
| 2010/0118298 A1 | 5/2010 | Bair et al. | |
| 2012/0001083 A1 | 1/2012 | Knapp | |
| 2014/0146316 A1 | 5/2014 | Shi | |
| 2014/0374622 A1 | 12/2014 | Cronin et al. | |
| 2016/0213252 A1 | 7/2016 | Hillman et al. | |
| 2017/0059485 A1 | 3/2017 | Yamamoto et al. | |
| 2018/0195959 A1 | 7/2018 | Anazawa et al. | |
| 2018/0246029 A1 * | 8/2018 | Wu | G01J 3/4406 |
| 2019/0072478 A1 | 3/2019 | Trotter et al. | |
| 2020/0391210 A1 * | 12/2020 | Handique | B01L 3/00 |

FOREIGN PATENT DOCUMENTS

| | | | | |
|---|---|---|---|---|
| EP | 1 1418 409 | * | 8/2002 | ............ G01J 3/4406 |
| EP | 1602902 A1 | * | 2/2004 | ............ G01J 3/4406 |
| EP | 1418409 | | 4/2006 | |
| EP | 2241907 | | 10/2010 | |
| EP | 1395374 | | 4/2013 | |
| EP | 3279657 | | 2/2018 | |
| JP | 2018006118 A | * | 1/2018 | |
| KR | 20190115095 | * | 10/2019 | ......... G01N 15/1434 |
| WO | WO2007100723 | | 9/2007 | |
| WO | WO20180156371 | | 8/2018 | |

OTHER PUBLICATIONS

Chin W.L et al. 'Design, Construction and Performance of a Spectrograph for Recording the Flash Spectrum during Solar Eclipse' Proceeding of the 2011 IEEE International Conference on Space Science and Communication (IconSpace) Jul. 12-13, 2011, Penang, Malaysia, p. 186 (Year: 2011).*
Spectronic Devices Ltd. https://web.archive.org/web/20030811210022/http:/spectronicdevices.com:80/minispectrometers/dualchanelminispect.html (Year: 2003) (Year: 2003).*
English Language Machine Translatoin of KR_20190115095_A_I (Year: 2019).*
Spectronic Devices Ltd dual channel spectroscope (Year: 2001).*
Dearden reference (Year: 2003).*
JP-2018006118-A TR, 2024, JP, Translation.*

* cited by examiner

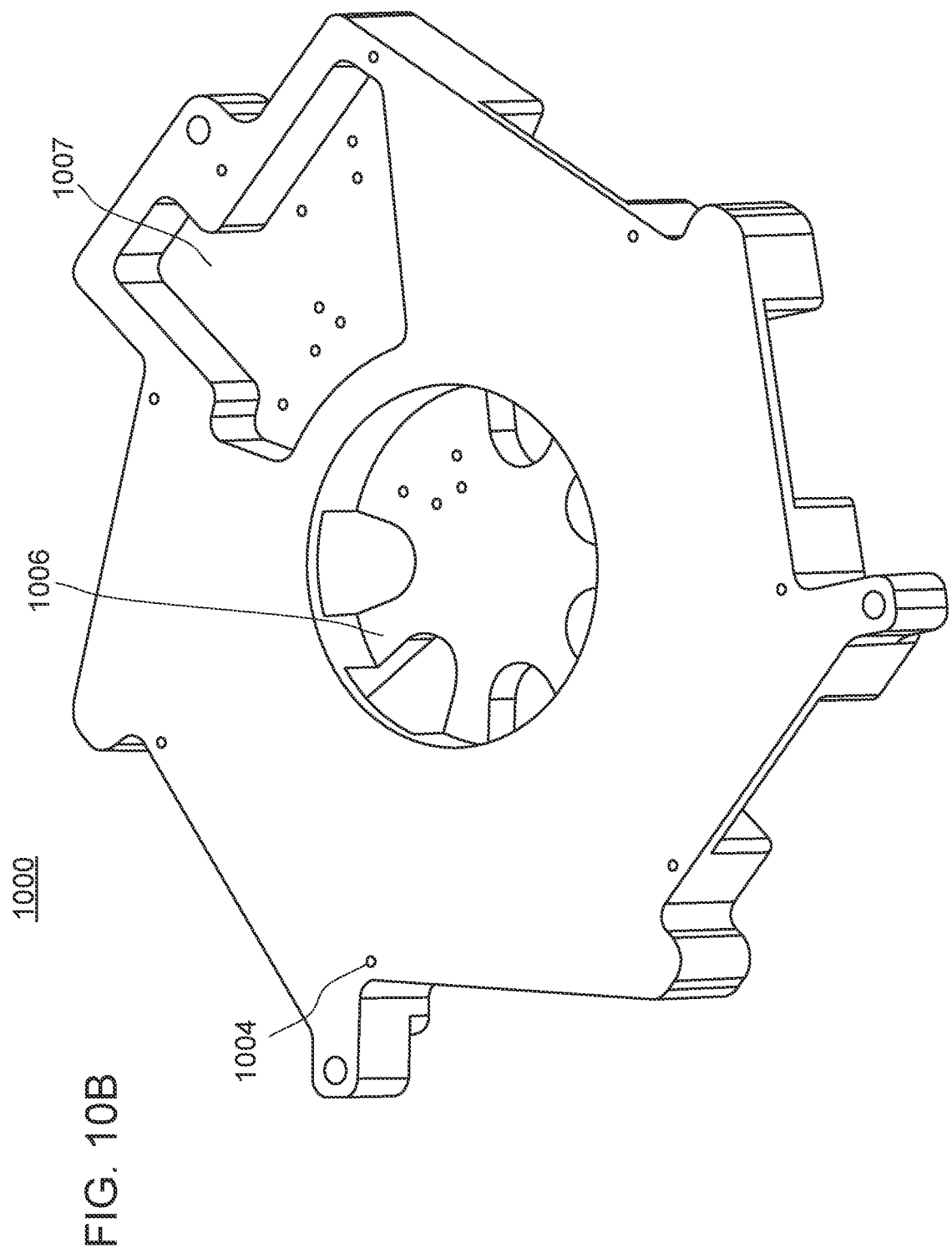

LIGHT DETECTION SYSTEMS HAVING FIRST AND SECOND LIGHT RECEIVERS, AND METHODS OF USE THEREOF

CROSS-REFERENCE TO RELATED APPLICATION

Pursuant to 35 U.S.C. § 119 (e), this application claims priority to the filing date of U.S. Provisional Patent Application Ser. No. 63/229,163 filed Aug. 4, 2021; the disclosure of which application is incorporated herein by reference in their entirety.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Particle analysis (e.g., flow cytometry) is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

The parameters measured using a particle analyzer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules or fluorescent dye. Different cell types can be identified by their light scatter characteristics and fluorescence emissions resulting from labeling various cell proteins or other constituents with fluorescent dye-labeled antibodies or other fluorescent probes. Forward-scattered light, side-scattered light and fluorescent light is detected by photodetectors that are positioned within the particle analyzer.

The development of clustered wavelength division (CWD) light detection systems—such as those described in U.S. application Ser. No. 17/159,453, incorporated by reference herein in its entirety—has recently led to improvements in the quality of light collection in flow cytometers. CWD systems include wavelength separators that pass light having a predetermined spectral range, as well as light detection modules in optical communication with each wavelength separator. Each light detection module includes a plurality of photodetectors and one or more optical components configured to convey light having a predetermined sub-spectral range to the photodetectors. Accordingly, CWD systems separate collected light into spectral ranges and require fewer reflections of the light in order to generate a plurality of sub-spectral ranges detected by photodetectors. Because reflections that generate distinct spectral ranges of light result in light loss—in certain instances causing poor detector signal quality (e.g., low signal to noise ratio)—the reduction of reflections in CWD systems reduces the amount of light loss and improve signal quality.

FIG. 1A-C depict an example of existing CWD light detection systems. As shown in FIG. 1A, light detection system 100 includes a core 103 having wavelength separators positioned therein. Light detection modules 101*a*-101*f* are situated around core 103 and each include a plurality of optical components and photodetectors (not shown). Collected light enters light detection system 100 via single light receiver 102 and passes into core 103. Light passed by the wavelength separators enters light detection modules 101*a*-101*f* via arms 104 for detection. The arms 104 are fixed to core 103 and light detection modules 101*a*-101*f* via screwed connections 105. FIG. 1B depicts a single light detection module 101*a*, heat sink 107 and the cross-section of an arm 104. As shown in FIG. 1C, each light detection module includes heat sink 107, a fan 108 and an arm 104 having a length 106.

SUMMARY

While CWD light detection systems constitute an improvement in the analysis of collected light in a flow cytometer, the present inventors have realized that such systems can be further improved. For example, the existing CWD light detection systems are only capable of analyzing one beam of collected light at a time. The inventors have discovered that the simultaneous analysis of multiple beams of collected light in a single light detection system would be desirable (e.g., to economize space). In addition, the inventors have understood that a light detection module cantilevered on the end of a relatively narrow arm (e.g., as shown in FIG. 1A-C) results in a lower system stiffness and a larger amplitude of oscillation at resonance during operation, thereby introducing noise into the collected signal. Furthermore, each light detection module in the existing systems employs an individual cooling device (e.g., fan) driven by individual motors that each introduce undesired vibrations into the system during operation. In view of the above, the inventors have realized that improvements to CWD light detection systems are desirable. The systems, baseplates, methods and kits provided herein satisfy this desire.

Aspects of the invention include light detection systems having first and second light receivers in fixed positions relative to each other, a plurality of wavelength separators configured to pass light from the first and second light receivers having a predetermined spectral range, and a plurality of light detection modules. The first and second light receivers discussed herein are configured to receive first and second beams of light, respectively. Light detection modules of interest are in optical communication with a wavelength separator of the plurality of wavelength separators and include a plurality of photodetectors. In some cases, the first and second light receivers each include a coupler for operably attaching an optical collection component. The light detection system may optionally include first and second optical collection components operably attached to the couplers for propagating light to the first and second light receivers, respectively. In certain instances, the first and second optical collection components include fiber optics (e.g., fiber optic relay bundles). In embodiments, the first and second light receivers each include a beam adjuster (e.g., a lens). In some cases, the wavelength separators (e.g., dichroic mirrors) are configured to convey light between each other. The number of wavelength separators in the plurality of wavelength separators may range from, for example, 2 to 6 (e.g., 5). The wavelength separators may be arranged such that the distance separating adjacent wavelength separators is constant. The first beam of light may, in embodiments, include light having wavelengths greater than 500 nm while the second beam of light includes light having wavelengths greater than 600 nm. In some versions, the first beam of light is conveyed by a first subset of wavelength separators (e.g., ranging from 2 to 4 wavelength separators) and the second beam of light is conveyed by a second subset of wavelength separators (e.g., ranging from 2 to 4 wavelength separators). In embodiments, each wavelength separator includes an adjustment mechanism configured to fine-tune the position of the wavelength separator. For example, in some cases, the adjustment mechanism is configured to fine-tune the position of the wavelength separator by rotating around a dowel pin. In additional cases, the adjustment mechanism includes a flexure for fine-tuning the position of the wavelength separator in a vertical direction and a set of screws for altering the conformation of the flexure. In embodiments, the light detection modules are arranged in a polygonal configuration (e.g., a heptagonal configuration). Light detection modules of interest additionally include one or more optical components configured to convey light having a predetermined sub-spectral range for detection. Where the light detection modules include a plurality of optical components, the optical components may be arranged, for example, along a single plane or two or more parallel planes. In embodiments, light detection modules include a plurality of photodetectors and optical components configured to convey light having a predetermined sub-spectral range to the photodetectors. Methods of assembling a light detection module are also provided.

Elements of the disclosure additionally involve systems (e.g., flow cytometric systems) for analyzing a particle. Systems of interest include a light source and a light detection system. As discussed above, the subject light detection system includes first and second light receivers in fixed positioned relative to each other, a plurality of wavelength separators configured to pass light from the first and second light receivers having a predetermined spectral range, and a plurality of light detection modules. In embodiments, the particle analysis systems include a plurality of light detection systems. For example, in some cases, the number of light detection systems in the plurality of light detection systems ranges from 2 to 6 (e.g., 3). In certain instances, systems further include a substrate upon which the light detection systems are co-located. In some embodiments, the substrate includes a plenum gaseously connected to each light detection system (e.g., via one or more tubes). In certain cases, the system includes a fan for generating negative pressure within the plenum and thereby circulating air through each light detection system.

Aspects of the invention additionally include baseplates for mounting a light detection system. Baseplates of interest include a stage for mounting a light receiver configured to receive a beam of light, a plurality of recesses for fixing a plurality of light detection modules in rigid alignment relative to the stage, and a heat dissipation opening positioned within each recess at a location proximal to a central point. Recesses of interest are arranged around the central point. The number of recesses in the plurality of recesses may range from, for example, 2 to 7 (e.g., 6, 5). The recesses may be arranged in any convenient configuration around the central point (e.g., heptagonal, pentagonal configuration, hexagonal configuration, octagonal configuration). Embodiments of the baseplate also include a cutout gaseously connected to each heat dissipation opening, where the cutout is configured to direct heat pooled from each detection module away from the light detection system. Baseplates may possess a diameter ranging from, for example, 150 mm to 250 mm (e.g., 200 mm). In addition, baseplates may possess a thickness ranging from, for example, 15 mm to 25 mm (e.g., 20 mm). In some cases, the baseplate may possess a thickness to diameter ratio of 1:10. In some instances, the baseplate is comprised of metal (e.g., an aluminum alloy) and includes a plurality of dowel pins configured to secure the light detection modules within the recess.

Aspects of the invention additionally include methods for practicing the invention as well as kits having components of the light detection systems, particle analysis systems and baseplates.

BRIEF DESCRIPTION OF THE FIGURES

The invention may be best understood from the following detailed description when read in conjunction with the accompanying drawings. Included in the drawings are the following figures:

FIG. 10A-B depict a baseplate according to certain embodiments.

DETAILED DESCRIPTION

Figure 1A:
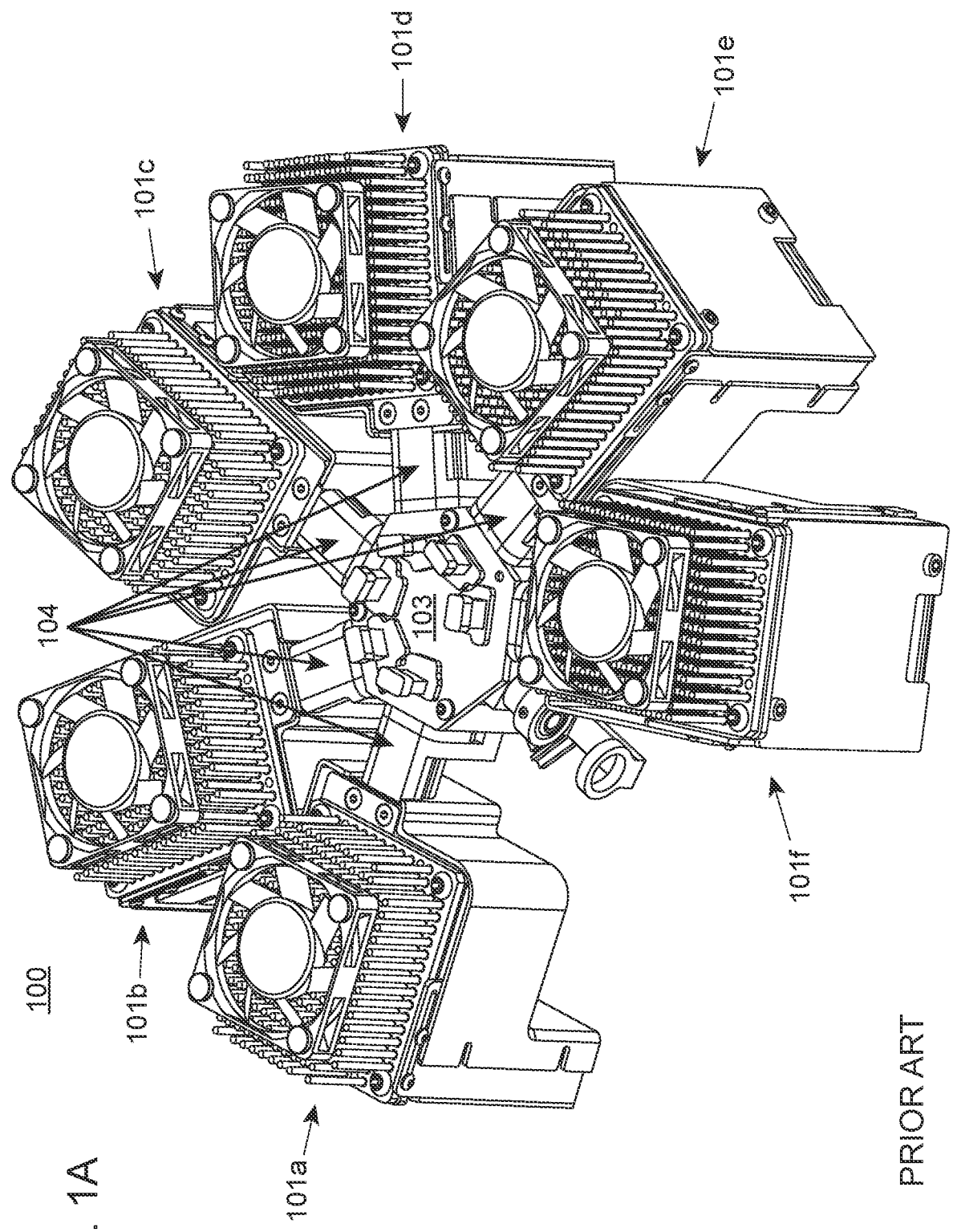
FIG. 1A-C depict an existing CWD light detection system.
Figure 1B:
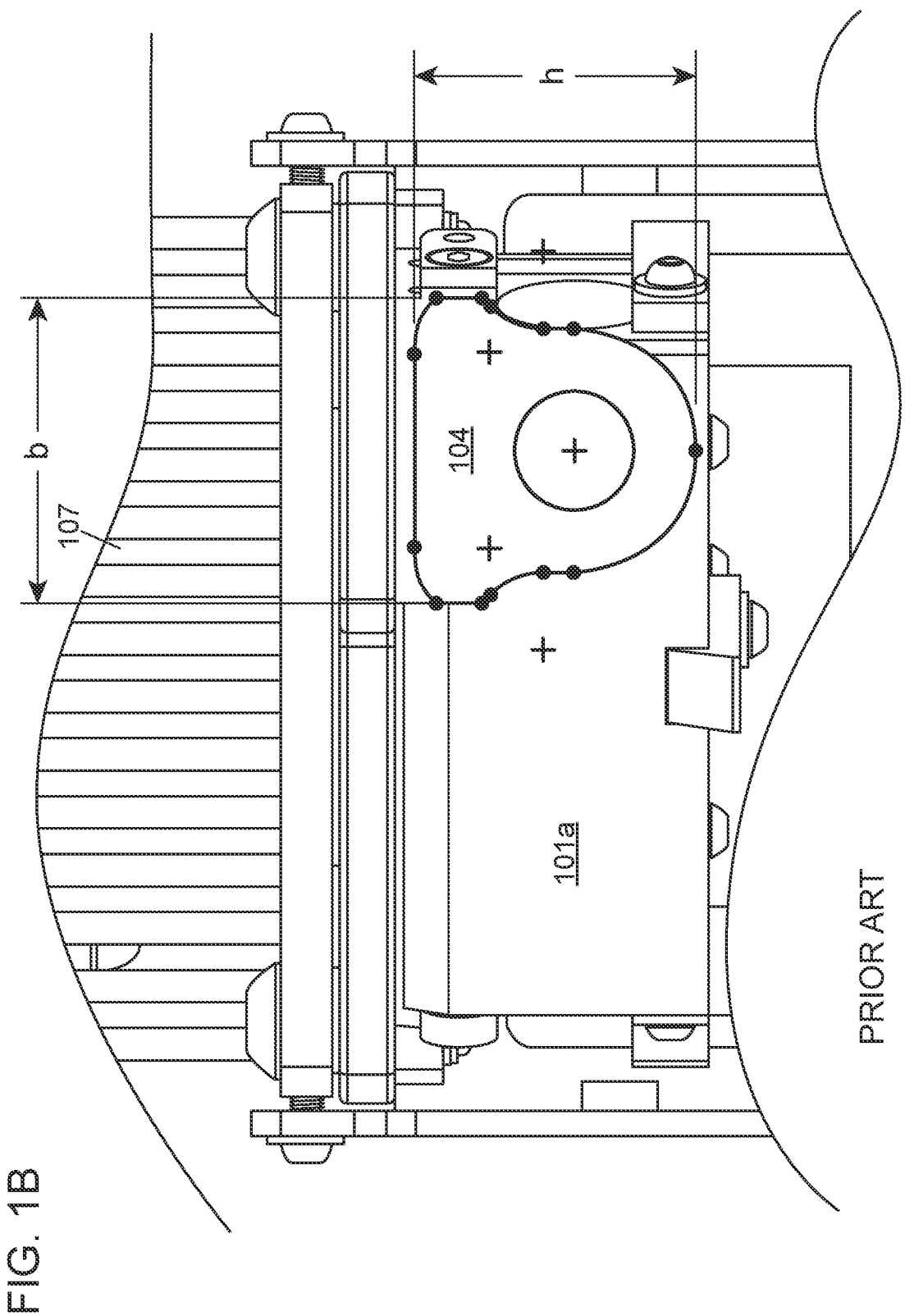
Figure 1C:
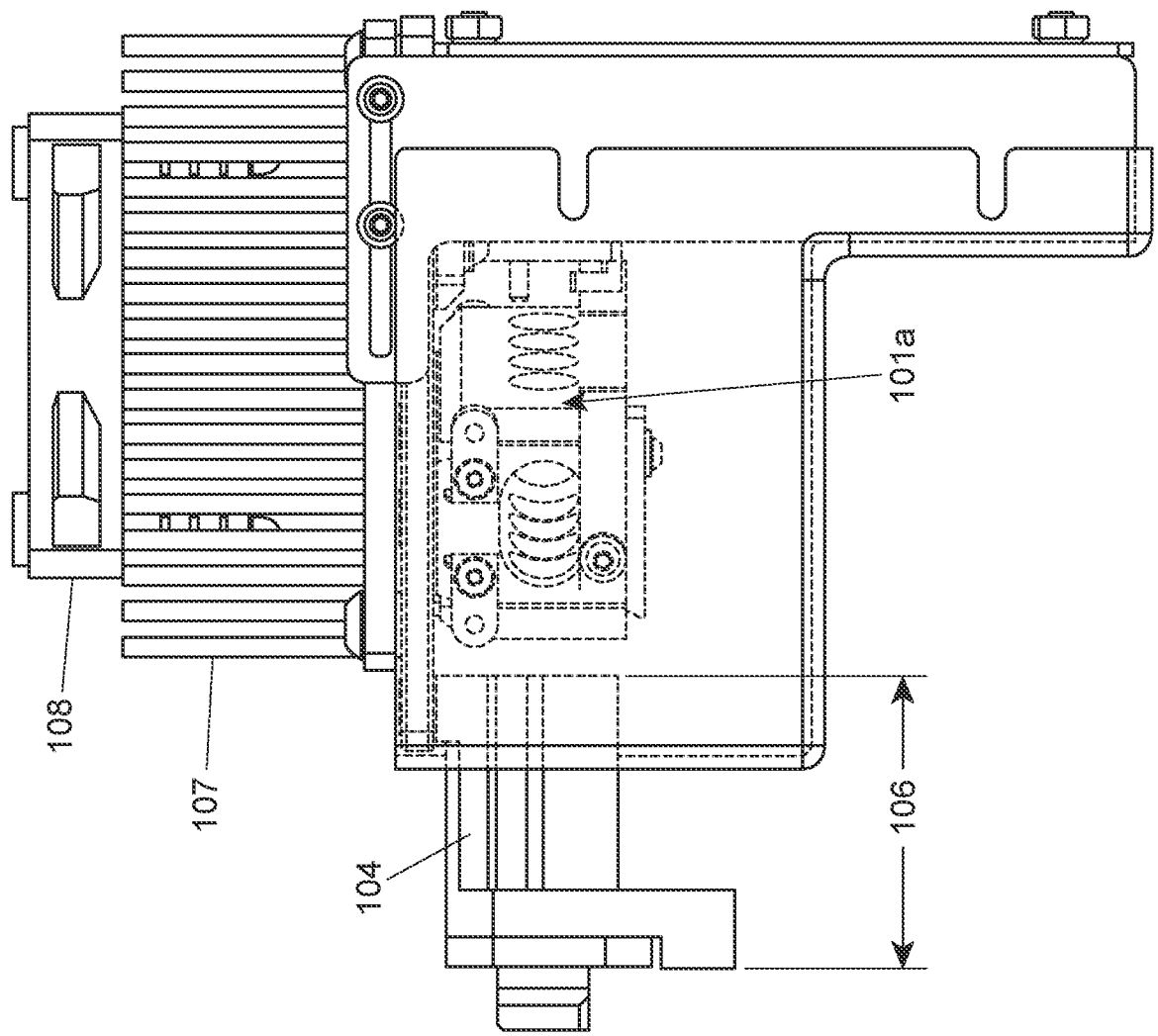

Light detection systems are provided. Aspects of the light detection systems include first and second light receivers in fixed positions relative to each other, a plurality of wavelength separators configured to pass light from the first and second light receivers having a predetermined spectral range, and a plurality of light detection modules. Baseplates having a stage for mounting a light receiver, a plurality of recesses for fixing a plurality of light detection modules in rigid alignment relative to the stage, and a heat dissipation opening positioned within each recess are also provided. In addition, particle analysis systems, methods and kits for practicing the invention are disclosed.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Light Detection Systems

Aspects of the invention include light detection systems having first and second light receivers in fixed positions relative to each other, a plurality of wavelength separators configured to pass light from the first and second light receivers having a predetermined spectral range, and a plurality of light detection modules. Light detection modules of interest are in optical communication with a wavelength separator in the plurality of wavelength separators and include plurality of photodetectors. The subject first and second light receivers are configured to receive first and second beams of light, respectively. As discussed herein, a "light receiver" refers to a device configured to receive collected light and propagate said light such that it travels in a desired direction and/or possesses certain properties. In some cases, light receivers are configured to receive light traveling through free space. Put another way, light is collected and conveyed to the light detection system by a free-space light relay system. The phrase "free-space light relay" is used herein in its conventional sense to refer to light propagation that employs a configuration of one or more optical elements to direct the light through free-space. By "free space" it is meant a gas (e.g., air) or a vacuum. The free-space relay system may include any combination of different optical elements, such as one or more of lenses, mirrors, slits, pinholes, wavelength separators, or a combination thereof. For example, in some embodiments, free-space light relay systems of interest include one or more focusing lenses. In other embodiments, the subject free-space light relay systems include one or more mirrors. In yet other embodiments, the free-space light relay system includes one or more collimating lenses.

In other cases, light receivers are configured to receive light traveling through an optical collection component. Optical collection components include, for example, fiber optics. In certain cases, the optical collection component includes a fiber optics relay bundle (e.g., multiple fiber optic components bundled together). In such instances, the optical collection component includes 2 or more fiber optics, such as 3 or more fiber optics, such as 4 or more fiber optics, such as 5 or more fiber optics, such as 6 or more fiber optics, such as 7 or more fiber optics, such as 8 or more fiber optics, such as 9 or more fiber optics, such as 10 or more fiber optics, such as 25 or more fiber optics, such as 50 or more fiber optics and including 100 or more fiber optics.

In some embodiments where the first and second light receivers include an optical collection component, one or both of the light receivers may include a coupler for operably attaching each respective optical collection component. As described herein, a "coupler" refers to an element configured to join the optical collection component to the light receiver such that light traveling through the optical collection component is transferred to the receiver. Couplers of interest are configured to engage with a fiber optic connector, e.g., in a mating relationship. In some cases, the coupler includes a recess for receiving the optical collection component which, in certain versions, includes a ferrule for securing the optical collection component relative to the coupler. In other embodiments, the coupler is configured to join the optical collection component via one or more fasteners, such as magnets, latches, notches, countersinks, counter-bores, grooves, pins, tethers, hinges, or a combination thereof.

The first and second light receivers may either be the same type or different type of light receiver. In some cases, both the first and second light receivers each include a coupler for operably attaching an optical collection component. In other cases, both the first and second light receivers are configured to receive light from a free-space light relay system. In such cases, the light receivers may include one or more reflective optical elements (e.g., mirrors) arranged to redirect collected light such that it enters the light detection system. In still other embodiments, the first light receiver includes a coupler for operably attaching an optical collection component and the second light receiver is configured to receive light from a free-space light relay system.

In some embodiments, one or both of the first and second light receivers additionally includes a beam adjuster. As described herein, a "beam adjuster" is an optical element configured to alter one or more properties of the light received by the light receiver. Properties of interest may include, but are not limited to, irradiation direction, wavelength, beam width, beam intensity and focal spot. Suitable beam adjusters include, for example, lenses, mirrors, pinholes, slits, gratings, light refractors, and any combination thereof. In some instances, the received light is passed through one or more focusing lenses, such as to reduce the profile of the light. In other instances, the beam adjuster includes one or more collimating lenses for reducing divergence of the beam conveyed to the light detection system. In some cases, the beam adjuster is an achromatic doublet lens.

The properties of the first and second beams of light received by the first and second light receivers may be the same or different. For example, in some cases, both the first and the second light beams include light exhibiting the same wavelength or range of wavelengths. In other embodiments, the first and second beams include light exhibiting different wavelengths or ranges of wavelengths. In some embodiments, the first beam of light is particle-modulated light that has been produced by irradiating a particle in a flow cell with a first light source, and the second beam of light is particle-modulated light that has been produced by irradiating a particle in a flow cell with a second light source. For example, in some embodiments, the first beam includes light having wavelengths greater than 500 nm. In some versions, the first beam includes a concentration of light energy in the yellow-green spectrum (e.g., 500-600 nm). In such versions, light in the ultraviolet (UV), violet, and blue spectra may have been filtered out from the first beam prior to its reception by the first light receiver. In additional embodiments, the second beam includes light having wavelengths greater than 600 nm. In some versions, the second beam includes a concentration of light in the red spectrum (e.g., 600-750 nm). In such versions, light in the UV, violet, blue and yellow-green spectra may have been filtered out from the second beam prior to its reception by the second light receiver.

In embodiments, light received from a sample is divided into three or more spectral ranges by passing the light through one or more wavelength separators. Each spectral range of light generated by the wavelength separators is further divided via optical components into smaller sub-spectral ranges which are detected by the photodetectors. In some embodiments, light detected from the sample is emitted light such as fluorescent light. In other embodiments, light detected from the sample is scattered light. The term "scattered light" is used herein in its conventional sense to refer to the propagation of light energy from particles in the sample (e.g., flowing in a flow stream) that are deflected from the incident beam path, such as by reflection, refraction or deflection of the beam of light.

In embodiments, light detection systems as described herein are configured to exhibit little to no light loss from the light collected from the sample. In some embodiments, light loss due to conveyance of light through the subject light detection system is 25% or less, such as 20% or less, such as 15% or less, such as 10% or less, such as 5% or less, such as 1% or less, such as 0.5% or less, such as 0.1% or less, such as 0.01% or less and including 0.001% or less. In certain instances, there is no light loss from propagating light from the sample through the subject light detection systems (i.e., shows no measurable light loss). For example, the amount of light from the sample decreases by 1 mW/cm$^2$ or less when conveyed through the subject light detection systems, such as 0.5 mW/cm$^2$ or less, such as 0.1 mW/cm$^2$ or less, such as 0.05 mW/cm$^2$ or less, such as 0.01 mW/cm$^2$ or less, such as 0.005 mW/cm$^2$ or less, such as 0.001 mW/cm$^2$ or less, such as 0.0005 mW/cm$^2$ or less, such as 0.0001 mW/cm$^2$ or less, such as 0.00005 mW/cm$^2$ or less and including 0.00001 mW/cm$^2$ or less.

In some embodiments, wavelength separators are configured to generate three or more predetermined spectral ranges of light from a light source (e.g., light from a sample irradiated with light, as described in detail below), such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more predetermined spectral ranges of light. In certain instances, light detection systems include a wavelength separator configured to generate first, second and third predetermined spectral ranges of light from a light source.

In some embodiments, light detection systems include 3 or more wavelength separators, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. The term "wavelength separator" is used herein in its conventional sense to refer to an optical component that is configured to separate light collected from the sample into predetermined spectral ranges. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

In embodiments, the wavelength separators are configured to pass light having wavelengths that range from a first wavelength, $X_i$ (in nanometers, nm) to a second wavelength $X_n$ (in nanometers, nm). In some embodiments, the wavelength separators are configured to pass light having wavelengths that range from $X_i$ to $X_n$, such as from 100 nm to 1500 nm, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm and including passing light having wavelengths that range from 600 nm to 1000 nm. In certain embodiments, wavelength separators in light detection systems of interest are configured to pass light having wavelengths that range from 360 nm to 960 nm.

In embodiments, wavelength separators of interest are each configured to generate predetermined spectral ranges of light, $X_s$ (in nanometers, nm). The predetermined spectral ranges may vary, where in certain embodiments, wavelength separators of interest are configured to generate spectral ranges ($X_s$) of light that span from 50 nm to 300 nm, such as from 75 nm to 275 nm, such as from 100 nm to 250 nm, such as from 125 nm to 225 nm and including from 150 nm to 200 nm. In certain embodiments, each wavelength separator is configured to generate a spectral range of light that spans 100 nm (i.e., $X_s$=100 nm).

In one example, light detection systems include a wavelength separator that is configured to generate a first predetermined spectral range of light of from 360 nm to 480 nm; a second predetermined spectral range of light of from 480 nm to 600 nm; a third predetermined spectral range of light of from 600 nm to 720 nm; a fourth predetermined spectral range of light of from 720 nm to 840 nm; and a fifth predetermined spectral range of light of from 840 nm to 960 nm.

In another example, light detection systems include a first wavelength separator configured to pass light having a wavelength that ranges from 360 nm to 480 nm (i.e., $X_s$=120 nm); a second wavelength separator configured to pass light having a wavelength that ranges from 480 nm to 600 nm; a third wavelength separator configured to pass light having a wavelength that ranges from 600 nm to 720 nm; a fourth wavelength separator configured to pass light having a wavelength that ranges from 720 nm to 840 nm; and a fifth wavelength separator configured to pass light having a wavelength that ranges from 840 nm to 960 nm.

In some embodiments, light detection systems of interest include three or more wavelength separators that are in optical communication with each other, such as being positioned to convey light between each other. The wavelength separators may be oriented with respect to each other in the light detection system (as referenced in an X-Z plane) at an angle ranging from 10° to 180°, such as from 15° to 170°, such as from 20° to 160°, such as from 25° to 150°, such as from 30° to 120° and including from 45° to 90°. In some instances, the wavelength separators are positioned along a single plane. In other instances, the wavelength separators are positioned along more than one plane. For example, the wavelength separators may be positioned along two or more parallel planes, such as three or more, such as four or more and including five or more parallel planes. In certain instances, the wavelength separators are arranged into a geometric configuration, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. In certain embodiments, the wavelength separators are arranged in a pentagonal configuration. In other embodiments, the wavelength separators are arranged in a heptagonal configuration. Wavelength separators may be separated from each other by any convenient distance. In some instances, adjacent wavelength separators are separated by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more, such as by 15 mm or more, such as by 25 mm or more and including by 50 mm or more. In certain cases, the distance separating adjacent wavelength separators is constant. In other words, the separation distance is the same for any neighboring pair of wavelength separators. In some instances where the distance separating adjacent wavelength separators in the plurality of wavelength separators is constant, such consistency provides analytical results that are more easily compared after signals received from photodetectors are digitized.

In some embodiments, the wavelength separators are configured to convey light between each other. In some instances, each wavelength separator is configured to pass a spectral range of light and to convey (e.g., by reflection) one or more remaining spectral ranges of light to another wavelength separator. In one example, the light detection system includes 3 wavelength separators. The first wavelength separator is configured to receive light from the sample and to pass a first spectral range of light and convey a second spectral range of light to the second wavelength separator. The second wavelength separator is configured to pass a third spectral range of light and to convey a fourth spectral range of light to the third wavelength separator. In some instances, the third spectral range of light is a portion of the second spectral range of light, such as a spectral range that spans 90% or less of the second spectral range of light, such 85% or less, such as 80% or less, such as 75% or less, such as 70% or less, such as 65% or less, such as 60% or less, such as 55% or less, such as 50%. The third wavelength separator is configured to pass a fifth spectral range of light. In some instances, the fifth spectral range of light is a portion of the fourth spectral range of light, such as a spectral range that spans 90% or less of the fourth spectral range of light, such 85% or less, such as 80% or less, such as 75% or less, such as 70% or less, such as 65% or less, such as 60% or less, such as 55% or less, such as 50%.

In another example, the light detection system includes 5 wavelength separators. The first wavelength separator is configured to receive light from the sample and to pass a first spectral range of light and convey a second spectral range of light to the second wavelength separator. The second wavelength separator is configured to pass a third spectral range of light and to convey a fourth spectral range of light to the third wavelength separator. In some instances, the third spectral range of light is a portion of the second spectral range of light, such as a spectral range that spans 90% or less of the second spectral range of light, such 85% or less, such as 80% or less, such as 75% or less, such as 70% or less, such as 65% or less, such as 60% or less, such as 55% or less, such as 50%. The third wavelength separator is configured to pass a fifth spectral range of light and to convey a sixth spectral range of light to the fourth wavelength separator. In some instances, the fifth spectral range of light is a portion of the fourth spectral range of light, such as a spectral range that spans 90% or less of the fourth spectral range of light, such 85% or less, such as 80% or less, such as 75% or less, such as 70% or less, such as 65% or less, such as 60% or less, such as 55% or less, such as 50%. The fourth wavelength separator is configured to pass a seventh spectral range of light and to convey an eighth spectral range of light to the fifth wavelength separator. In some instances, the seventh spectral range of light is a portion of the sixth spectral range of light, such as a spectral range that spans 90% or less of the sixth spectral range of light, such 85% or less, such as 80% or less, such as 75% or less, such as 70% or less, such as 65% or less, such as 60% or less, such as 55% or less, such as 50%. The fifth wavelength separator is configured to pass a ninth spectral range of light. In some instances, the ninth spectral range of light is a portion of the eighth spectral range of light, such as a spectral range that spans 90% or less of the eighth spectral range of light, such 85% or less, such as 80% or less, such as 75% or less, such as 70% or less, such as 65% or less, such as 60% or less, such as 55% or less, such as 50%.

In certain embodiments, the light detection system includes 5 wavelength separators configured to separate light having wavelengths ranging from 360 nm to 960 nm, where the first wavelength separator is configured to pass light having a wavelength ranging from 360 nm to 480 nm and to convey light having a wavelength that ranges from 480 nm to 960 nm to the second wavelength separator; the second wavelength separator is configured to pass light having a wavelength ranging from 480 nm to 600 nm and to convey light having a wavelength that ranges from 600 nm to 960 nm to the third wavelength separator; the third wavelength separator is configured to pass light having a wavelength ranging from 600 nm to 720 nm and to convey light having a wavelength that ranges from 720 nm to 960 nm to the fourth wavelength separator; and the fourth wavelength separator is configured to pass light having a wavelength ranging from 720 nm to 840 nm and to convey light having a wavelength ranging from 840 nm to 960 nm to the fifth wavelength separator. In this embodiment, the fifth wavelength separator is configured to pass light having a wavelength ranging from 840 nm to 960 nm.

As discussed above, the subject first and second light receivers are configured to receive first and second beams of light. In some embodiments, the first beam of light is conveyed by a first subset of wavelength separators and the second beam of light is conveyed by a second subset of wavelength separators. For example, in some cases, the first subset of wavelength separators includes a first wavelength separator configured to pass light having a wavelength that ranges from 500-600 nm (i.e., yellow-green), a second wavelength separator configured to pass light having a wavelength that ranges from 600-675 nm (i.e., red), and a third wavelength separator configured to pass light having a wavelength that ranges from 675-750 nm (i.e., red). In other embodiments, the first subset of wavelength separators includes a first wavelength separator configured to pass light having a wavelength that ranges from 450-500 nm (i.e., blue), a second wavelength separator configured to pass light having a wavelength that ranges from 500-600 nm (i.e., yellow-green), a third wavelength separator configured to pass light having a wavelength that ranges from 600-675 nm (i.e., red), and a fourth wavelength separator configured to pass light having a wavelength that ranges from 675-750 nm (i.e., red). In certain instances, the second subset of wavelength separators includes a first wavelength separator configured to pass light having a wavelength that ranges from 600-675 nm (i.e., red), and a second wavelength separator configured to pass light having a wavelength that ranges from 675-750 nm (i.e., red).

Certain embodiments of the subject light detection systems additionally include a third light receiver configured to receive a third beam of light. In such embodiments, the same light detection system is configured to analyze 3 beams of collected light and may further include a third subset of wavelength separators configured to convey the third beam of light.

As discussed above, light detection systems include a light detection module in optical communication with each wavelength separator. For example, each wavelength separator in the first and second subsets is in optical communication with a light detection module such that each wavelength separator is associated with a dedicated light detection module. In some embodiments, the light detection modules are positioned in physical contact with the wavelength separator, such as where an opening to the light detection module is physically coupled to the wavelength separator. In other embodiments, each light detection module is positioned from the wavelength separator by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more, such as by 15 mm or more, such as by 25 mm or more and including by 50 mm or more. For instance, each light detection module may be positioned from the wavelength separator by a distance of from 0.0001 mm to 100 mm, such as from 0.0005 mm to 95 mm, such as from 0.001 mm to 90 mm, such as from 0.005 mm to 85 mm, such as from 0.01 mm to 80 mm, such as from 0.05 mm to 75 mm, such as from 0.1 mm to 70 mm, such as from 0.5 mm to 65 mm, such as from 1 mm to 60 mm, such as from 1.5 mm to 55 mm and including from 2 mm to 50 mm.

In some embodiments, one or more wavelength separators in the plurality of wavelength separators includes an adjustment mechanism configured to fine-tune the position of the wavelength separator. For example, in some cases, the adjustment mechanism may be employed to optimize the direction in which the wavelength separator is configured to reflect and/or pass light. In some versions, the adjustment mechanism is configured to fine-tune the position of the wavelength separator by rotating around a dowel pin. In such embodiments, the light detection system includes a dowel pin at the location where the wavelength separator is to be placed and the adjustment mechanism includes a recess configured to receive the dowel pin. When the dowel pin is located within the recess, the adjustment mechanism is configured to rotate around the pin and thereby alter the position of the wavelength separator.

In further embodiments, the adjustment mechanism includes a flexure for fine-tuning the position of the wavelength separator in a vertical direction. The "flexure" discussed herein is referred to in its conventional sense to describe a flexible element configured to operate via elastic body deformation. By "elastic body deformation" it is meant the ability of a deformed body to return to its original shape after the cause of deformation is removed. In certain embodiments, the movement of the flexure may be characterized by certain degrees of freedom. "Degrees of freedom" are discussed in their conventional sense to refer to the number of independent variables required to define the position of a rigid body. In certain cases, the subject flexure operates within a single degree of freedom. In some cases, the adjustment mechanism additionally includes a set of screws for altering the conformation of the flexure. In other words, where it is desirable for a user to alter the position of the wavelength separator in a vertical direction, the user may tighten and or loosen one or more screws and thereby adjust the shape of the flexure. In certain cases, the set of screws constitute a push-pull mechanism. In such cases, the adjustment mechanism may include a push screw configured to exert a force on the flexure in a first direction and a pull screw configured to exert a force on the flexure in a second direction. In certain cases, the adjustment mechanism further includes a screw for securing the attachment mechanism to a substrate (e.g., baseplate). In some embodiments, adjustment of the wavelength separators via the adjustment mechanism allows for precision in beam targeting within the light detection module. In some versions, such precise targeting prevents undesired reflections, back-scatter, crosstalk or other forms of interference between the first beam of light and the second beam of light. In other words, the co-location of the first and second beams within the same light detection system does not result in interference.

Light detection modules may be releasably connected to the wavelength separator. The term "releasably" is used herein in its conventional sense such that each light detection module or wavelength separator may be freely detached and re-attached. Light detection modules or wavelength separators may be connected by any convenient protocol. In certain embodiments, the light detection modules and wavelength separators are connected together with a fastener, such as magnets, latches, notches, countersinks, counterbores, grooves, pins, tethers, hinges, non-permanent adhesives or a combination thereof. In certain instances, a light detection module is connected to a wavelength separator by slot-fitting the wavelength separator into a groove of the light detection module. In yet other instances, a wavelength separator is connected to a light detection module by one or more screws.

In some embodiments, light from each wavelength separator is conveyed to each light detection module by an optical collection system. Each optical collection system may be any suitable light collection protocol that collects the spectral range of light passed by the wavelength separator and directs the light to the light detection module. In some embodiments, the optical collection system includes fiber optics, such as a fiber optics light relay bundle. In other embodiments, the optical collection system is a free-space light relay system.

In embodiments, each optical collection system may be physically coupled to the light detection module, such as with an adhesive, co-molded together or integrated into each light detection module. In certain embodiments, each light detection module and optical collection system are integrated into a single unit. In some instances, each light detection module is coupled to an optical collection system with a connector that fastens the optical collection system to each light detection module, such as with a hook and loop fasteners, magnets, latches, notches, countersinks, counterbores, grooves, pins, tethers, hinges, non-permanent adhesives or a combination thereof.

In other embodiments, each light detection module and optical collection system are in optical communication, but are not physically in contact. In embodiments, the optical collection system may be positioned 0.001 mm or more from the light detection module, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection module.

In certain embodiments, the optical collection system includes fiber optics. For example, the optical collection system may be a fiber optics light relay bundle and the spectral range of light passed by the wavelength separator is conveyed through the fiber optics light relay bundle to the light detection module. Any fiber optics light relay system may be employed to convey light, where in certain embodiments, suitable fiber optics light relay systems include, but are not limited to, fiber optics light relay systems such as those described in U.S. Pat. No. 6,809,804, the disclosure of which is herein incorporated by reference.

In other embodiments, each optical collection system is a free-space light relay system. In certain embodiments, the free-space light relay system includes a housing having a proximal end and a distal end, the proximal end being coupled to the light detection module. The free-space relay system may include any combination of different optical components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating the spectral range of light from a wavelength separator include, but are not limited to, light relay systems such as those described in U.S. Pat. Nos. 7,643,142; 7,728,974 and 8,223,445, the disclosures of which is herein incorporated by reference.

The light detection modules may be arranged (e.g., co-mounted together) in any geometric configuration in the subject light detection systems as desired. The light detection modules may be arranged along one or more plane. In some embodiments, the light detection modules may be oriented with respect to each other (as referenced in an X-Z plane) at an angle ranging from 0° to 180°, such as from 10° to 170°, such as from 20° to 160°, such as from 25° to 150°, such as from 30° to 120° and including from 45° to 90°. In embodiments, the light detection modules may be arranged with respect to each other at an angle that is the same or different depending on the number of light detection modules in the light detection system. For example, in certain instances the angle between a first light detection module and a second light detection module is the same as the angle between the second light detection modules and a third light detection module. In some embodiments, the angle between a first light detection module and a second light detection module are different than the angle between the second light detection module and a third light detection module. In some embodiments, the light detection modules are positioned in a geometric arrangement such as a star-shaped configuration, a triangular configuration, a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations.

In some embodiments, light detection modules possess complementary shapes such that the modules may be co-located with one another when they are arranged around a central point. In some embodiments, the light detection modules are substantially wedge-shaped. In other words, if the light detection system were conceptualized as a pie, each constituent light detection module may be thought of as a slice of the pie. By "substantially wedge-shaped" it is meant that the light detection modules may or may not be perfect wedges and, in some embodiments, include one or more regions in which the sides of the modules deviate from a straight line. Light detection modules may be located in close proximity to one another, such as where adjacent light detection modules are separated by 5 mm or less, such as 4 mm or less, 3 mm or less, 2 mm or less, 1 mm or less, 0.5 mm or less and including where the light detection modules are in physical contact with one another.

In some embodiments, light detection systems additionally include a side-scattered light detector (also referred to as a side-scatter detector). As discussed above, side-scattered light is the light that is scattered by the particle in an orthogonal direction to the excitation laser. Where light detection systems include a side-scattered light detector, versions of the system may additionally include a side-scattered light separator configured to separate side scattered wavelength light from light received by the light receiver. The side-scattered light separator may, in certain instances, be positioned between the light receiver and the light detection modules. In some cases, the side scattered-light separator may be configured to redirect (e.g., back-scatter) side scattered light at an angle ranging from 1° to 90° with respect to the optical axis of light received by the light receiver, such as 30° to 60° and including 40° to 50°. The redirected light is subsequently detected by the side-scattered light detector. Any convenient detector may be employed as the side-scattered light detector described herein. In some embodiments, the side-scattered light detector is a photomultiplier tube (PMT). In other embodiments, the side-scattered light detector is a photodiode (e.g., an avalanche photodiode). In some embodiments, the side-scattered light detector is equipped with a focusing aspheric lens that concentrates light on the photosensitive area of the detector. In other embodiments, one or more optical filters may be employed instead of, or in addition to, the focusing aspheric lens.

Figure 2A:
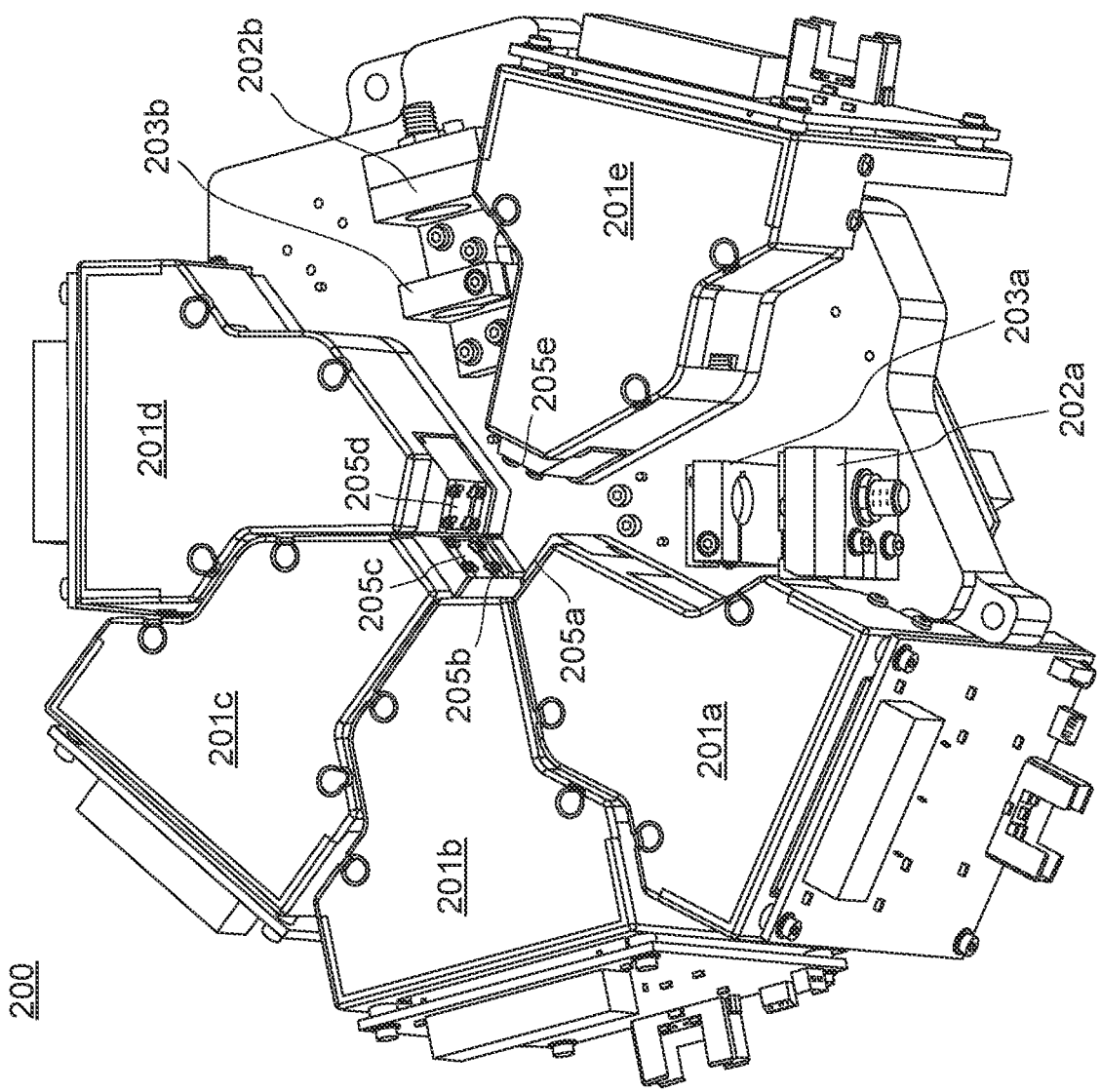
FIG. 2A-D depict a light detection system according to certain embodiments.
Figure 2B:
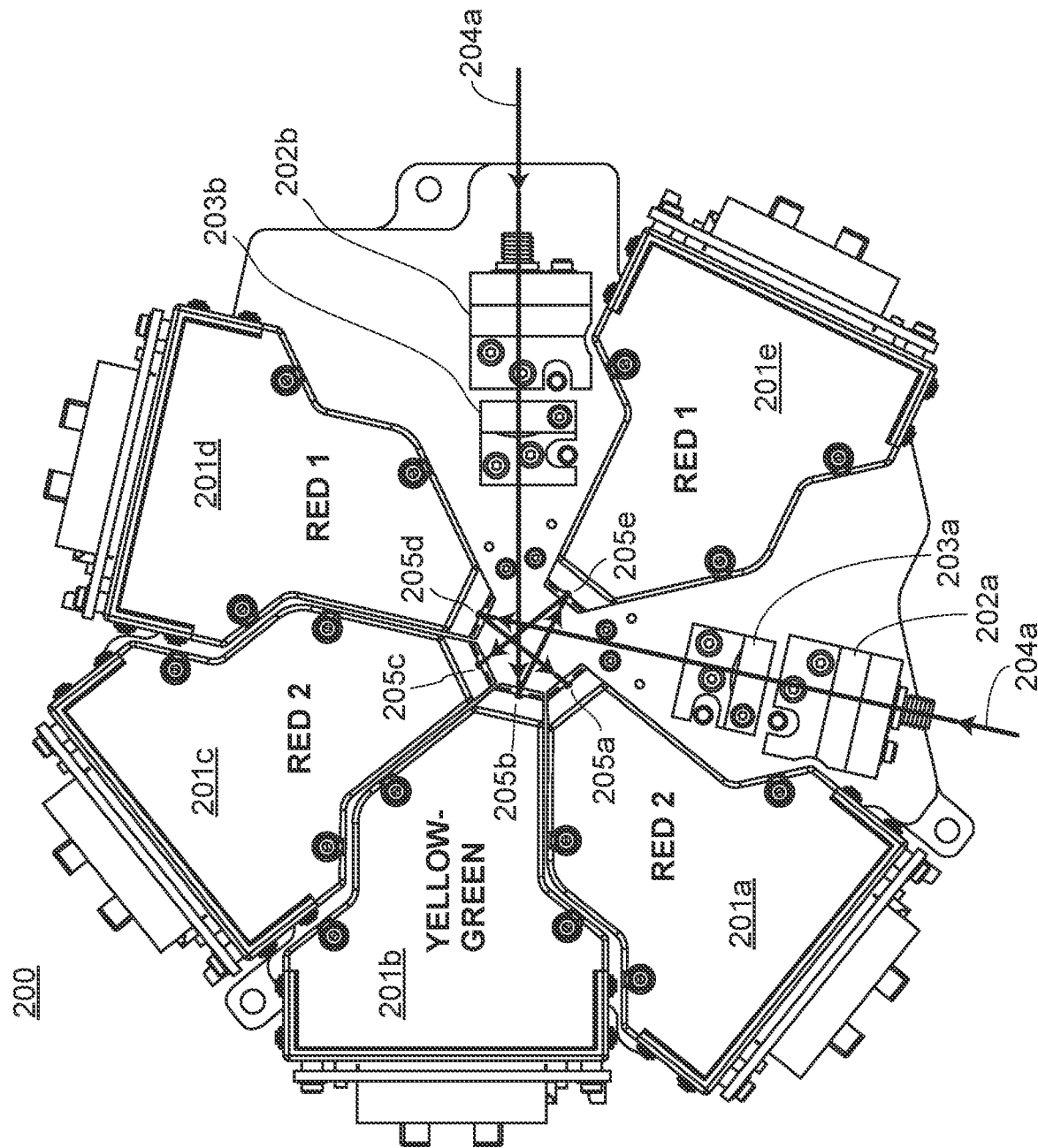

FIG. 2A-2D depict a light detection system according to certain embodiments of the invention. As shown in FIG. 2A, light detection system 200 includes a first light receiver 202b, a first beam adjuster 203b, a second light receiver 202a, a second beam adjuster 203a, light detection modules 201a-201e and wavelength separators 205a-205e. As shown in FIG. 2B first beam of light 204b enters light detection system 200 via light receiver 202b and is adjusted by first beam adjuster 203b. First beam 204b encounters wavelength separator 205b associated with light detection module 201b. Wavelength separator 205b passes light having a predetermined spectral range and directs the remaining light to wavelength separator 205e associated with light detection module 201e. Wavelength separator 205e passes light having a predetermined spectral range and directs remaining light to wavelength separator 205c associated with light detection module 201c. Second beam 204a enters light detection system 200 via light receiver 202a and is adjusted by first beam adjuster 203a. Second beam 204a encounters wavelength separator 205d associated with light detection module 201d. Wavelength separator 205d passes light having a predetermined spectral range and directs the remaining light to wavelength separator 201a associated with light detection module 201a.

Figure 2C:
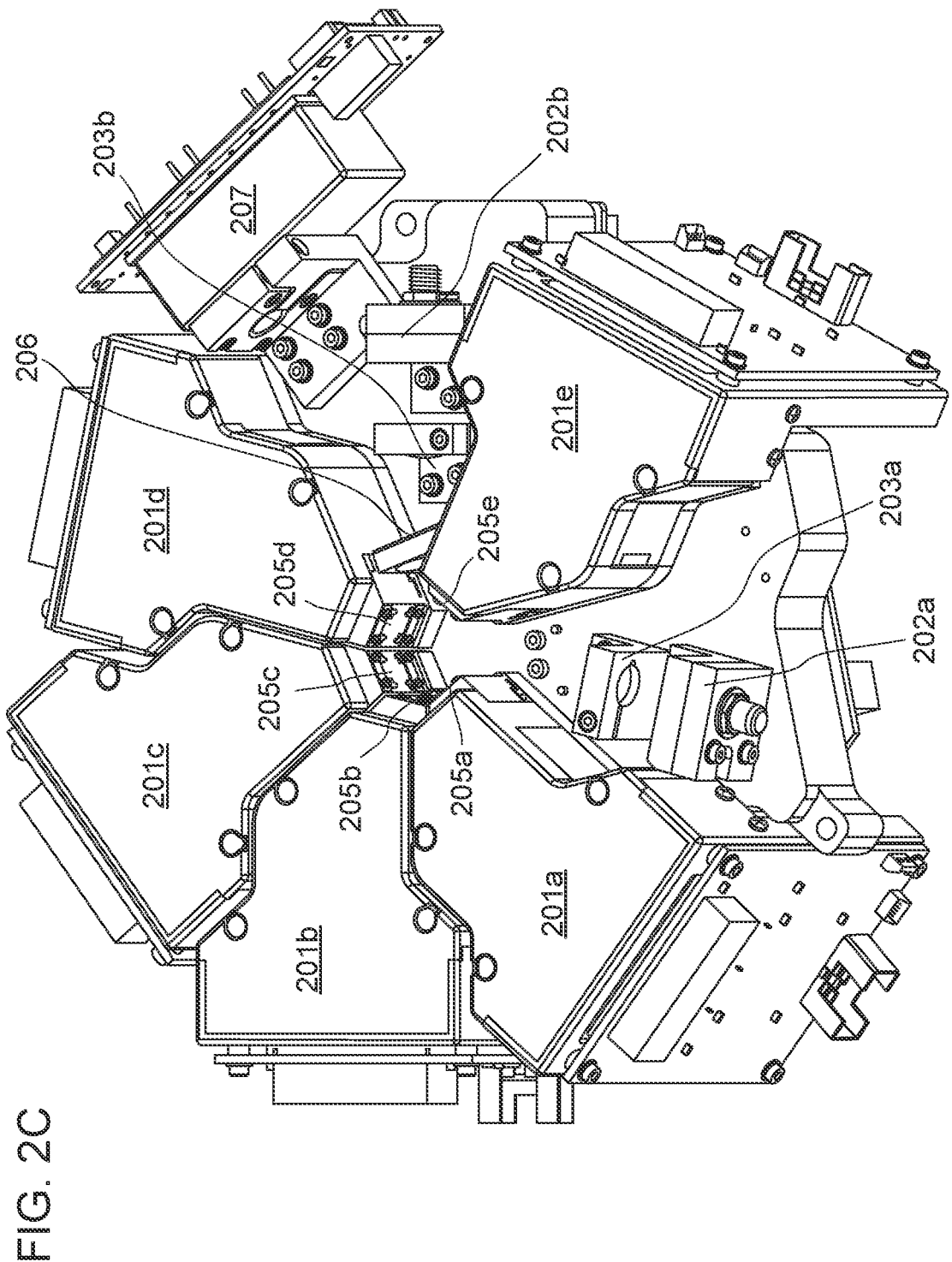
Figure 2D:
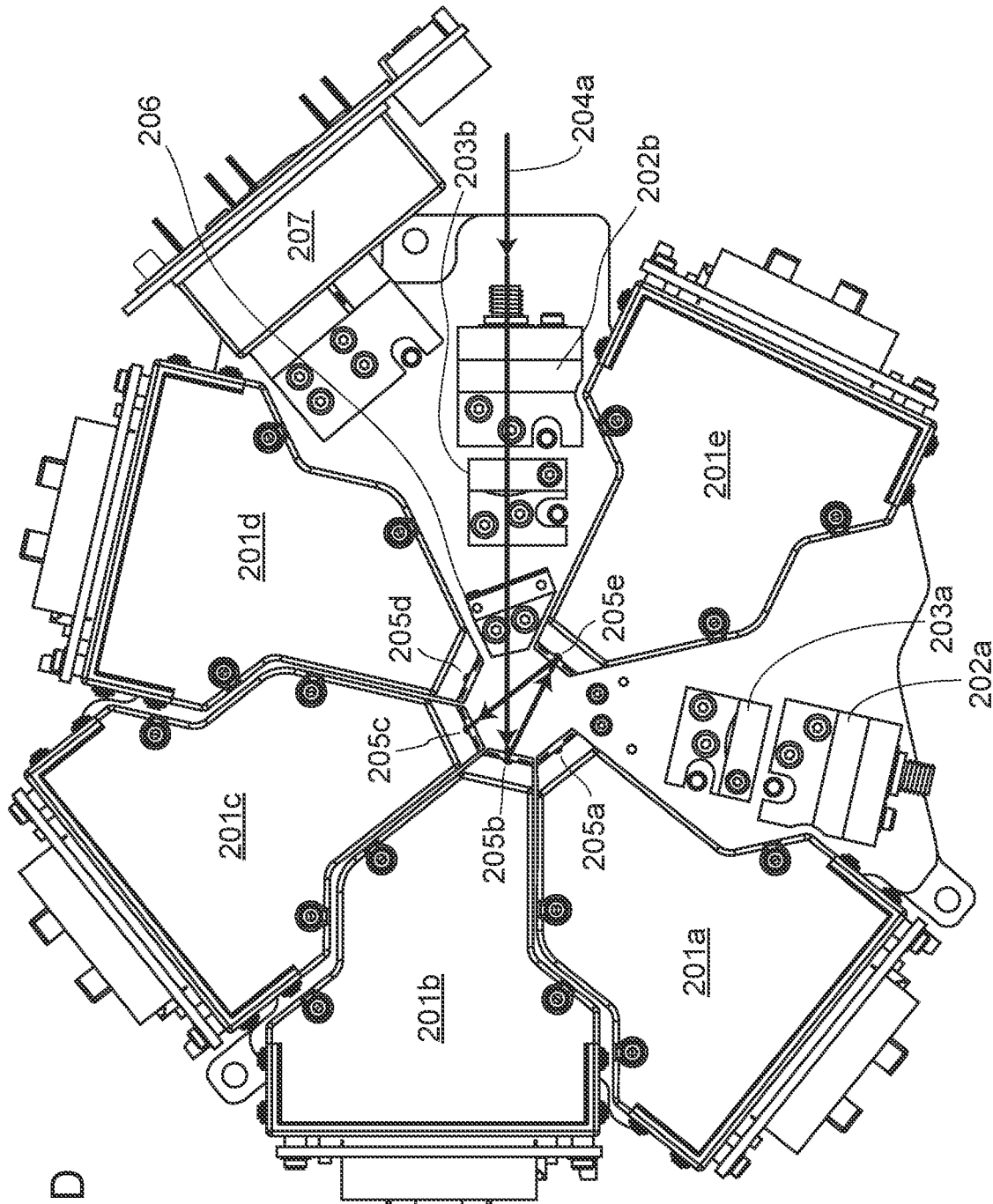

FIG. 2C-D depict a light detection system having a side-scattered light detector. In addition to the components described above with respect to FIG. 2A-B, the systems of FIG. 2C-D include a side-scattered light detector 207 and a side-scattered light separator 206.

Figure 3A:
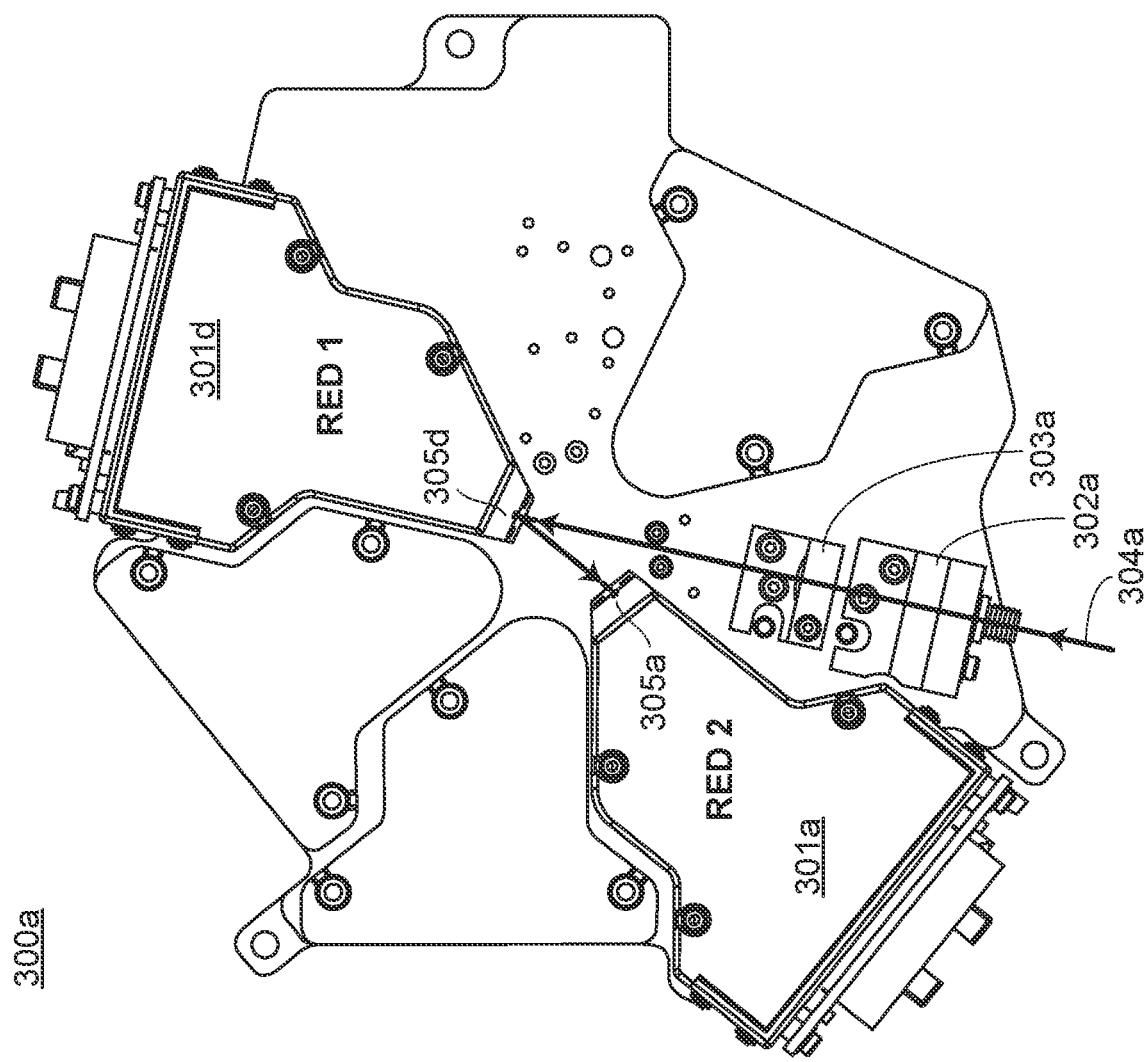
FIG. 3A-B depict first and second subsets of wavelength separators and light detection modules according to certain embodiments.
Figure 3B:
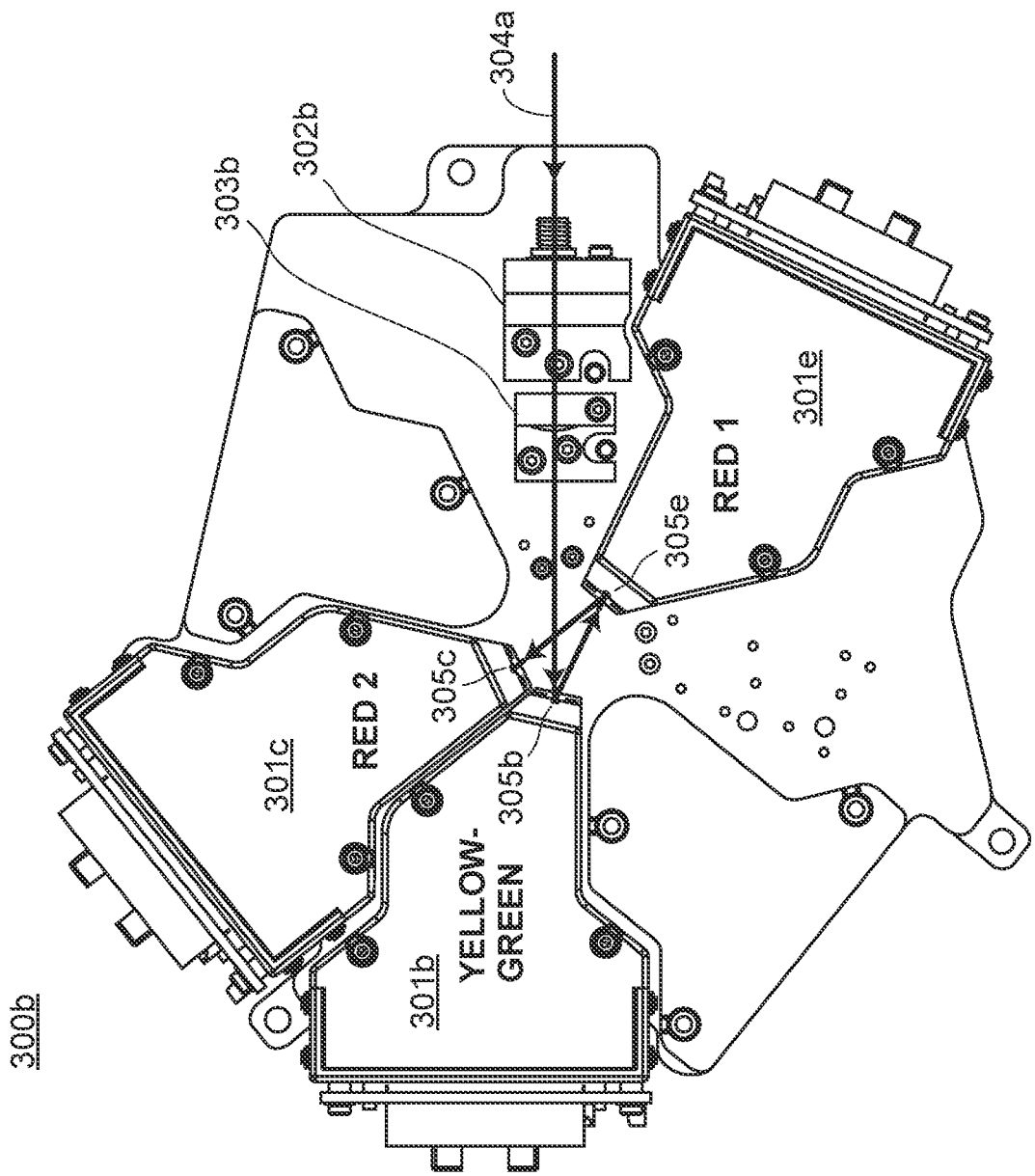

FIG. 3A-3B present a separated view of the first and second subsets of wavelength separators and light detection modules shown in FIG. 2A-2B. While the subject invention co-locates the first and second subsets in a single light detection system, FIG. 3A-3B demonstrate the path the first and second beams follow with respect to each subset. As shown in FIG. 3A, second beam 304a enters light detection system 300a via light receiver 302a and is adjusted by beam adjuster 303a. Second beam 304a encounters wavelength separator 305d associated with light detection module 301d. Wavelength separator 305d passes light having a predetermined spectral range and directs the remaining light to wavelength separator 305a associated with light detection module 301a. As shown in FIG. 3B, first beam of light 304b enters light detection system 300b via light receiver 302b and is adjusted by first beam adjuster 303b. First beam 304b encounters wavelength separator 305b associated with light detection module 301b. Wavelength separator 305b passes light having a predetermined spectral range and directs the remaining light to wavelength separator 305e associated with light detection module 301e. Wavelength separator 305e passes light having a predetermined spectral range and directs remaining light to wavelength separator 305c associated with light detection module 301c.

Figure 4B:
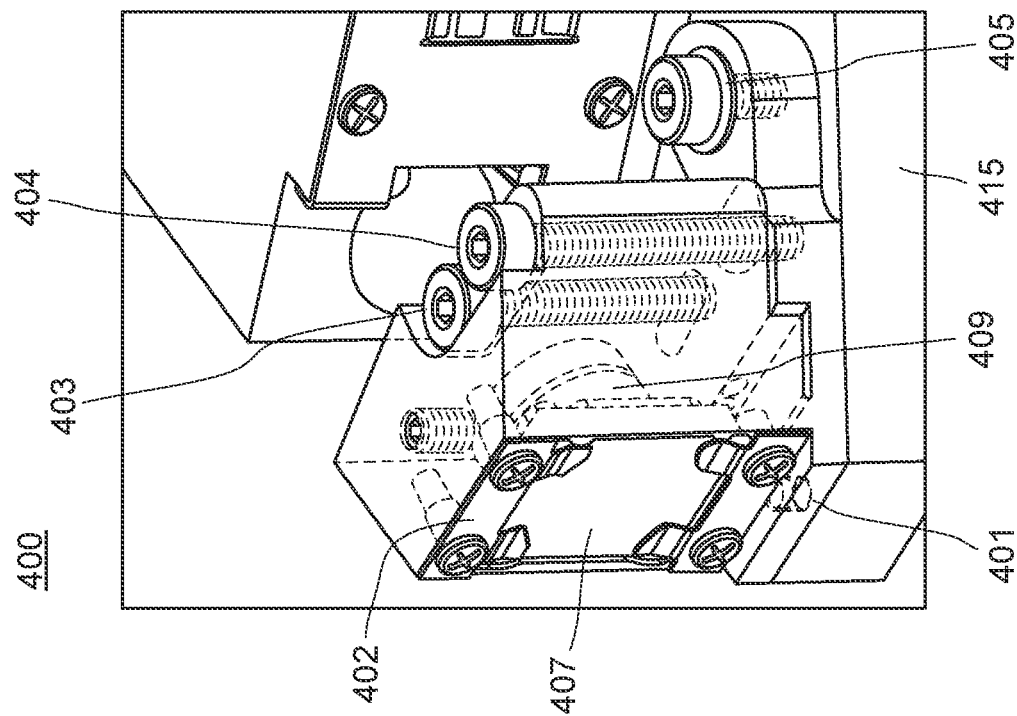
FIG. 4A-C depict an adjustment mechanism according to certain embodiments.
Figure 4A:
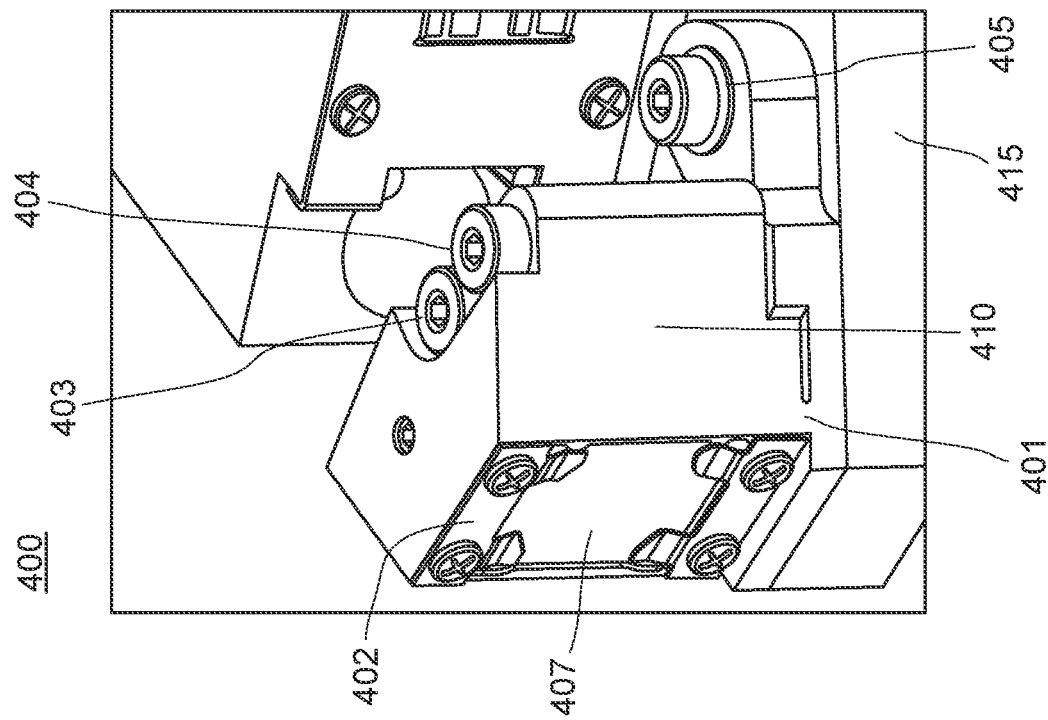
Figure 4C:
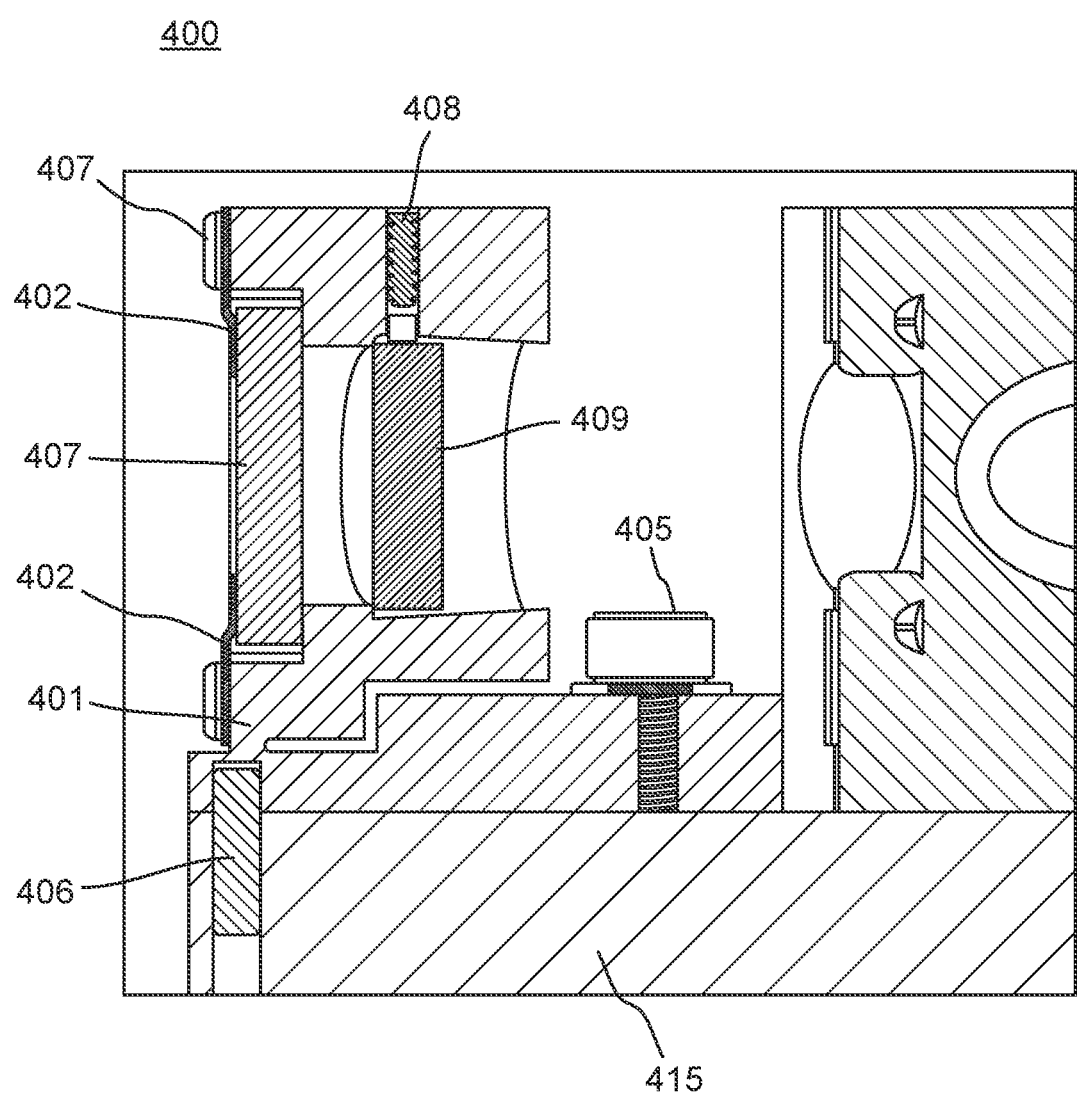

FIG. 4A-C depicts an adjustment mechanism 400 configured to fine-tune the position of a wavelength separator. As shown in FIG. 4A, wavelength separator 407 is immobilized by clamp 402 relative to mounting block 410, which mounting block is attached to baseplate 415 via screw 405. The adjustment mechanism 400 includes flexure 401 for fine-tuning the position of wavelength separator 407 in a vertical direction. Push screw 403 and pull screw 404 constitute a push-pull mechanism for changing the conformation of flexure 401, as desired. FIG. 4B presents a view of attachment mechanism 400 in which the interior of mounting block 410 is visible. Attachment mechanism 400 is configured to pivot on dowel pin 406 such that the wavelength separator 407 may rotate, as desired. Lens 409 is configured to relay light passed by wavelength separator 407 to a light detection module. FIG. 4C presents a profile view of attachment mechanism 400. Soft tip or brass set screw 408 is present to maintain lens 409 in place.

In some embodiments, each light detection module includes an optical adjustment component (in some cases referred to as "optical component") configured to convey light having a predetermined sub-spectral range to one or more photodetectors. By "optical adjustment" is meant that light is changed or adjusted when conveyed to each photodetector in the light detection module. In some embodiments, optical adjustment includes propagating light having a predetermined sub-spectral range to a photodetector. In some embodiments, each light detection module includes one or more optical adjustment components that are configured to separate light conveyed from the wavelength separator into predetermined sub-spectral ranges by passing light having a predetermined sub-spectral range and reflecting one or more remaining spectral ranges of light. In other embodiments, the optical adjustment component is configured to separate light conveyed from the wavelength separator into predetermined sub-spectral ranges by passing light having a predetermined sub-spectral range and absorbing one or more remaining spectral ranges of light. In yet other embodiments, the optical adjustment component is configured to spatially diffract light conveyed from the wavelength separator into the predetermined sub-spectral ranges. Optical adjustment components may be any convenient light separation protocol, such as one or more dichroic mirrors, bandpass filters, diffraction gratings, beam splitters or prisms. In certain embodiments, optical adjustment components in the light detection modules that are configured to separate light conveyed from the wavelength separator into predetermined sub-spectral ranges are dichroic mirrors.

Depending on the wavelengths of light passed from the wavelength separator to the light detection module (as described above), the one or more optical components in the light detection module may be configured to convey light having wavelengths that range from a first wavelength, $Y_i$ (in nanometers, nm) to a second wavelength $Y_n$ (in nanometers, nm) to the photodetectors. In some embodiments, the one or more optical components are configured to convey light having wavelengths that range from 100 nm to 1500 nm to the photodetectors, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm and including propagating light having wavelengths that range from 600 nm to 1000 nm to the photodetectors.

In embodiments, the optical components in each light detection module are configured to convey a predetermined sub-spectral range of light, $Y_s$ (in nanometers, nm) to each photodetector. The predetermined sub-spectral ranges conveyed by each optical component may vary, where certain optical components of interest are configured to convey sub-spectral ranges of light that span from 5 nm to 50 nm, such as from 6 nm to 49 nm, such as from 7 nm to 48 nm, such as from 8 nm to 47 nm, such as from 9 nm to 46 nm and including from 10 nm to 45 nm. In certain embodiments, the optical component is configured to pass a spectral range of light that spans 20 nm.

For instance, in one example the one or more optical components are configured to pass light having wavelengths that range from 360 nm (i.e., $Y_i$=360 nm) to a 480 nm (i.e., $Y_n$=480 nm) in sub-spectral ranges that span 20 nm (i.e., $Y_s$=20 nm). In this embodiment, the light detection module includes a first optical component that is configured to convey light having wavelengths that range from 360 nm to 380 nm to a photodetector; a second optical component that is configured to convey light having wavelengths that range from 380 nm to 400 nm to a photodetector; a third optical component that is configured to convey light having wavelengths that range from 400 nm to 420 nm to a photodetector; a fourth optical component that is configured to convey light having wavelengths that range from 420 nm to 440 nm to a photodetector; a fifth optical component that is configured to convey light having wavelengths that range from 440 nm to 460 nm to a photodetector; and a sixth optical component that is configured to convey light having wavelengths that range from 460 nm to 480 nm to a photodetector.

In some embodiments, the optical components in each light detection module are in optical communication with each other, such as being positioned to convey light between each other. The optical components may be oriented with respect to each other in the light detection module (as referenced in an X-Z plane) at an angle ranging from 10° to 180°, such as from 15° to 170°, such as from 20° to 160°, such as from 25° to 150°, such as from 30° to 120° and including from 45° to 90°. In some instances, the optical components are positioned along a single plane. In other instances, the optical components are positioned along more than one plane. For example, the optical components may be positioned along two or more parallel planes, such as three or more, such as four or more and including five or more parallel planes. In certain instances, the optical components are arranged into a geometric configuration, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. In certain embodiments, the optical components are arranged in a hexagonal configuration. In other embodiments, the optical components are arranged in a heptagonal configuration.

In some embodiments, the optical components are configured to convey light between each other. In some instances, each optical component is configured to pass a spectral range of light and to convey (e.g., by reflection) one or more remaining spectral ranges of light to another optical component. In one example, the light detection module includes 3 optical components. The first optical component is configured to receive light from a wavelength separator and to pass a first sub-spectral range of light and convey a second sub-spectral range of light to the second optical component. The second optical component is configured to pass a third sub-spectral range of light and to convey a fourth sub-spectral range of light to the third optical component. In some instances, the third sub-spectral range of light is a portion of the second sub-spectral range of light, such as a sub-spectral range that spans 90% or less of the second sub-spectral range of light, such 85% or less, such as 80% or less, such as 75% or less, such as 70% or less, such as 65% or less, such as 60% or less, such as 55% or less, such as 50%. The third optical component is configured to pass a fifth sub-spectral range of light. In some instances, the fifth sub-spectral range of light is a portion of the fourth sub-spectral range of light, such as a sub-spectral range that spans 90% or less of the fourth sub-spectral range of light, such 85% or less, such as 80% or less, such as 75% or less, such as 70% or less, such as 65% or less, such as 60% or less, such as 55% or less, such as 50%.

In another example, the light detection module includes 5 optical components. The first optical component is configured to receive light from a wavelength separator and to pass a first sub-spectral range of light and convey a second sub-spectral range of light to the second optical component. The second optical component is configured to pass a third sub-spectral range of light and to convey a fourth sub-spectral range of light to the third optical component. In some instances, the third sub-spectral range of light is a portion of the second sub-spectral range of light, such as a sub-spectral range that spans 90% or less of the second sub-spectral range of light, such 85% or less, such as 80% or less, such as 75% or less, such as 70% or less, such as 65% or less, such as 60% or less, such as 55% or less, such as 50%. The third optical component is configured to pass a fifth sub-spectral range of light and to convey a sixth sub-spectral range of light to the fourth optical component. In some instances, the fifth sub-spectral range of light is a portion of the fourth sub-spectral range of light, such as a sub-spectral range that spans 90% or less of the fourth sub-spectral range of light, such 85% or less, such as 80% or less, such as 75% or less, such as 70% or less, such as 65% or less, such as 60% or less, such as 55% or less, such as 50%. The fourth optical component is configured to pass a seventh sub-spectral range of light and to convey an eighth sub-spectral range of light to the fifth optical component. In some instances, the seventh spectral range of light is a portion of the sixth spectral range of light, such as a spectral range that spans 90% or less of the sixth spectral range of light, such 85% or less, such as 80% or less, such as 75% or less, such as 70% or less, such as 65% or less, such as 60% or less, such as 55% or less, such as 50%. The fifth optical component is configured to pass a ninth sub-spectral range of light. In some instances, the ninth sub-spectral range of light is a portion of the eighth sub-spectral range of light, such as a sub-spectral range that spans 90% or less of the eighth sub-spectral range of light, such 85% or less, such as 80% or less, such as 75% or less, such as 70% or less, such as 65% or less, such as 60% or less, such as 55% or less, such as 50%.

As described above, light detection systems are configured to generate a plurality of sub-spectral ranges of light from the light collected from the sample. In some embodiments, light detection systems are configured to generate 2 or more distinct spectral ranges of light for every reflection by an optical component (e.g., dichroic mirror) in the light detection system, such as 3 or more, such as 4 or more and including being configured to generate 5 or more distinct spectral ranges of light for every reflection by an optical component in the subject light detection systems. In certain embodiments, light detection systems are configured to generate 30 distinct spectral ranges using 10 reflections by optical components or less, such as generating 30 distinct spectral ranges of light from 9 reflections by optical components or less. In certain instances, the ratio of generated distinct spectral ranges to number of reflections by optical components in the subject light detection systems may range from 2:1 to 10:1, such as from 3:1 to 7:1 and including from 3:1 to 5:1.

In some instances, the optical component is configured to collimate the light. The term "collimate" is used in its conventional sense to refer to the optically adjusting the collinearity of light propagation or reducing divergence by the light of from a common axis of propagation. In some instances, collimating includes narrowing the spatial cross section of a light beam. In other instances, optical includes changing the direction of the light beam, such as changing the propagation of the light beam by 1° or more, such as by 5° or more, such as by 10° or more, such as by 15° or more, such as by 20° or more, such as by 25° or more, such as by 30° or more, such as by 45° or more, such as by 60° or more, such as by 75° or more and including changing the direction of light propagation by 90° or more. In yet other instances, optical is a de-magnification protocol so as to decrease the dimensions of the light (e.g., beam spot), such as decreasing the dimensions by 5% or more, such as by 10% or more, such as by 25% or more, such as by 50% or more and including decreasing the dimensions by 75% or more.

Each sub-spectral range of light is conveyed by the optical component to a photodetector. In some embodiments, the optical component is in physical contact with the photodetector. In other embodiments, the optical component is in optical communication with the active surface of the photodetector and may be positioned 0.001 mm or more from the photodetector, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the photodetector.

In embodiments, each light detection module includes two or more photodetectors, such as 3 or more, such as 4 or more, such as 5 or more, such as 6 or more, such as 7 or more, such as 8 or more, such as 9 or more, such as 10 or more, such as 15 or more, such as 25 or more, such as 50 or more and including 100 or more photodetectors. In some embodiments, light detection modules include one or more photodetector arrays. The term "photodetector array" is used in its conventional sense to refer to an arrangement or series of two or more photodetectors. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. The photodetectors in each array may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in each photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°.

The photodetectors may be any convenient optical sensor, such as active-pixel sensors (APSs), avalanche photodiodes, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In certain embodiments, photodetectors include photomultiplier tubes, such as metal package photomultiplier tubes.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In embodiments, the photodetectors are configured to measure light continuously or in discrete intervals. In some instances, photodetectors of interest are configured to take measurements of the collected light continuously. In other instances, the photodetectors are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In certain embodiments, one or more of the photodetectors described herein are positioned in a detection block. Detection blocks of interest are configured to receive one or more photodetectors therein. The detection blocks described herein may be constructed from any convenient material. In some embodiments, detection blocks include a thermally conductive material. In certain embodiments, the thermally conductive material includes a metal, such as copper or aluminum. In certain cases, the detection block is manufactured from copper. In some instances, detection blocks are coated with a thermal compound (e.g., thermal paste). Thermal compounds of interest include, but are not limited to epoxies, silicones, urethanes and acrylates. One or more photodetectors may be secured to the detector block within a light detection module, for example, by a clamp described in U.S. Provisional Patent Application No. 63/210,390, the disclosure of which is incorporated by reference in its entirety.

In some instances, light detection systems additionally include a temperature regulation system configured to dissipate heat produced by the photodetectors. For example, in embodiments, light detection modules include a thermoelectric cooler in contact with a bottom surface of one or more detection blocks. The term "thermoelectric cooler" is used herein in its conventional sense to refer to a heat pump which transfers heat between the junction of two different surfaces (e.g., a "cool" surface and a "hot" surface) in response to the application of an electrical current. In certain embodiments, heat flux between the two different surfaces is generated by the Peltier effect and thermoelectric coolers of interest are Peltier heat pumps. In some embodiments, the two different surfaces (e.g. plates) of the thermoelectric cooler are formed from different materials (n-type semiconductors, p-type semiconductors), such as narrow band-gap semiconductors and heavy element materials having low thermal conductivity. For example, the surfaces of thermoelectric coolers of interest may be formed from semiconductors such as bismuth telluride, lead telluride, silicon germanium, bismuth-antimony alloys, and combinations thereof. In some instances, thermoelectric coolers are coated with a thermal compound (e.g., thermal paste). Thermal compounds of interest include, but are not limited to epoxies, silicones, urethanes and acrylates. In certain embodiments, thermoelectric coolers of interest include those described in U.S. Patent Publication No. 2004/0155251, U.S. Pat. Nos. 6,499,306; 4,581,898; 4,922,822; 5,409,547 and 2,984,077, the disclosures of which are incorporated herein by reference.

In additional embodiments, light detection modules include a heat sink in thermal contact with the thermoelectric cooler. The heat sink may include, for example, heat dissipation fins. Heat dissipation fins according to embodiments may be any convenient shape configured to dissipate heat from the heat transfer block and may be a cylinder, cube, cone, cylinder, half sphere, star, triangular prism, rectangular prism (cuboid), hexagonal prism or other suitable polyhedron. For example, the heat dissipation fin may have a cross-section in the shape of a circle, oval, half-circle, crescent-shaped, star-shaped, square, triangle, rhomboid, pentagon, hexagon, heptagon, octagon, rectangle or other polygon. The heat sink may, in certain embodiments, include a plurality of heat dissipation fins, such as 2 or more heat dissipation fins, such as 5 or more, such as 10 or more, such as 15 or more, such as 25 or more, such as 50 or more and including 100 or more heat dissipation fins.

In embodiments, the temperature regulation system additionally includes an air intake at a bottom portion of each light detection module. Cool air received from the intake passes through the heat sink of each light detection module. Heat is transferred from the heat dissipation fins of the heat sink to the air. The resulting heated air is pooled from each light detection module and is expelled.

Figure 5:
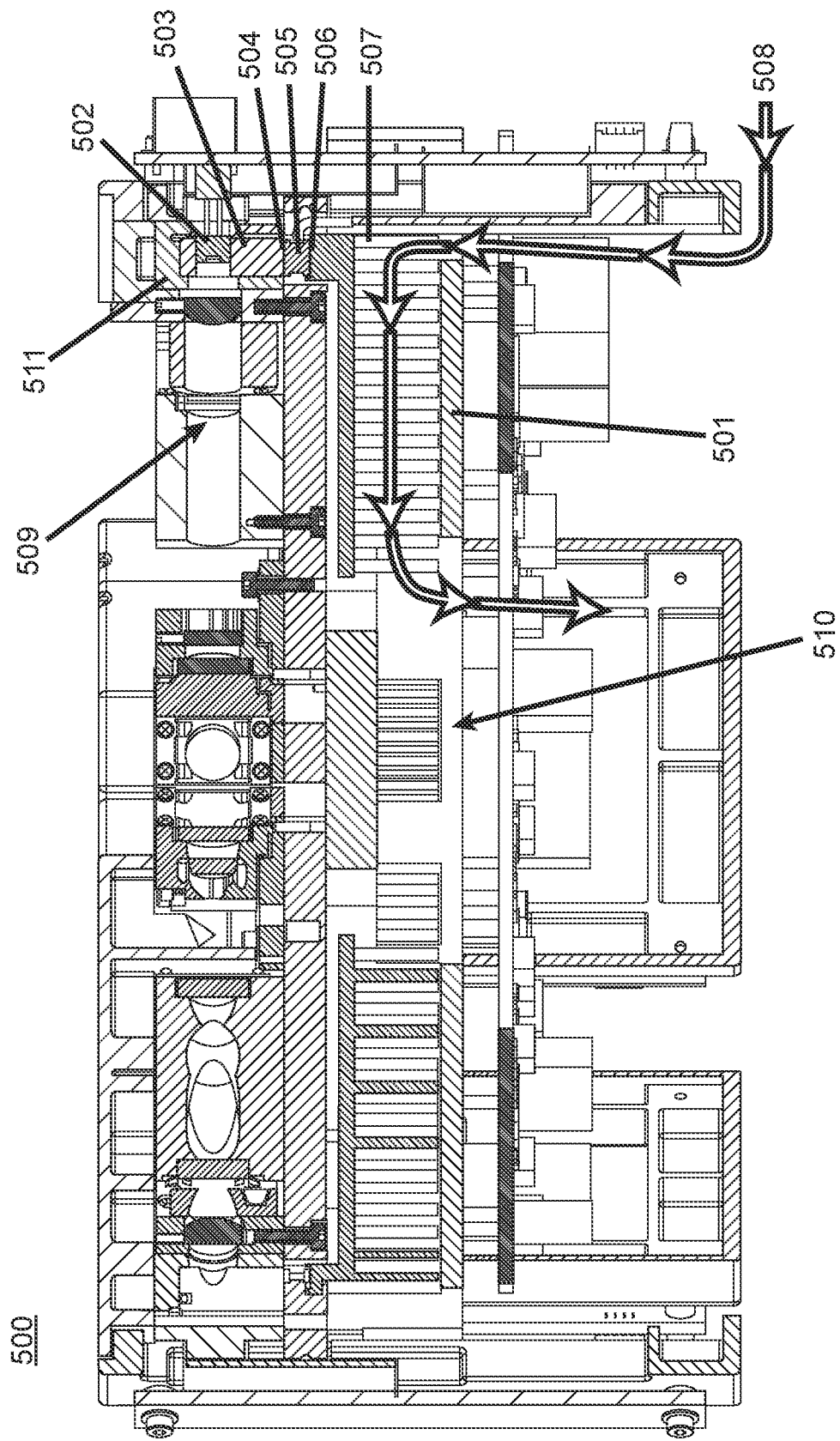
FIG. 5 depicts a light detection system according to certain embodiments.

FIG. 5 depicts a light detection system 500 having a temperature regulation system according to certain embodiments. As shown in FIG. 5, light detection module 509 possesses photodetector 502 positioned within detection block 504. Light detection module 509 includes a clamp 511 configured to apply an immobilizing force to photodetector 502. Detection block 504 includes a thermal compound 504 and is in contact with a thermoelectric cooler 505 coated with thermal compound 506. Cool air 508 enters the light detection system 500 (along the path denoted by arrows), passes through heat sink 507 and receives heat. Heated air from the plurality of light detection modules is then pooled in the central core 510 of the light detection system 500 and expelled.

Particle Analysis Systems

Aspects of the invention also include particle analysis systems. Systems of interest include a light source, a flow cell, and a light detection system. As discussed above, the subject light detection systems include first and second light receivers in fixed positions relative to each other, a plurality of wavelength separators configured to pass light from the first and second light receivers having a predetermined spectral range, and a plurality of light detection modules. The subject particle analysis systems include any convenient number of light detection systems In certain instances, particle analysis systems include a single light detection system. In other instances, particle analysis systems include a plurality of light detection systems. For example, in some embodiments, the number of light detection systems in the plurality of light detection systems ranges from 2 to 6, such as 2 to 4 and including 2 to 3. In certain cases, the particle analysis systems described herein may include 2 light detection systems, 3 light detection systems or 4 light detection systems.

In certain cases, particle analysis systems of interest include a substrate for mounting the light detection system(s). Where particle analysis systems include a plurality of light detection systems, the plurality of light detection systems may be co-located upon the substrate. The substrate may be composed of any convenient material. In certain instances, the substrate includes one or more metal components including, for example, aluminum, titanium, brass, iron, lead, nickel, steel (e.g., stainless steel), copper, tin as well as combinations and alloys thereof. In additional embodiments, the substrate includes one or more rigid plastic materials such as, for example, polycarbonates, polyvinyl chloride (PVC), polyurethanes, polyethers, polyamides, polyimides, among other polymeric plastic materials.

In some instances, the substrate includes a plenum gaseously connected to each light detection system. As discussed herein, the "plenum" is referred to in its conventional sense to describe a space for facilitating air circulation through a system. The plenum is a sealed volume formed by the substrate upon which the light detection system(s) is/are mounted. In certain versions, the plenum is gaseously connected to each light detection system via a tube. In such versions, the tube connects to each light detection system at the central core and thereby collects the heat pooled at that location from each light detection module (e.g., as described above).

In embodiments, the system includes a fan for generating negative pressure within the plenum and thereby circulating air through each light detection system. The negative pressure in the plenum causes ambient air to be pulled across the heat sinks of each light detection module on each light detection system simultaneously. The air pooled from each light detection module in each light detection system is pulled through the tubes into the plenum where the heat is expelled from the system. In certain cases, the particle analysis system additionally includes one or more elastomeric dampers (also referred to as elastomeric isolators) configured to prevent any vibrations from the fan from transmitting to the optics of the light detection modules and thereby generating noise in collected signal.

Figure 6:
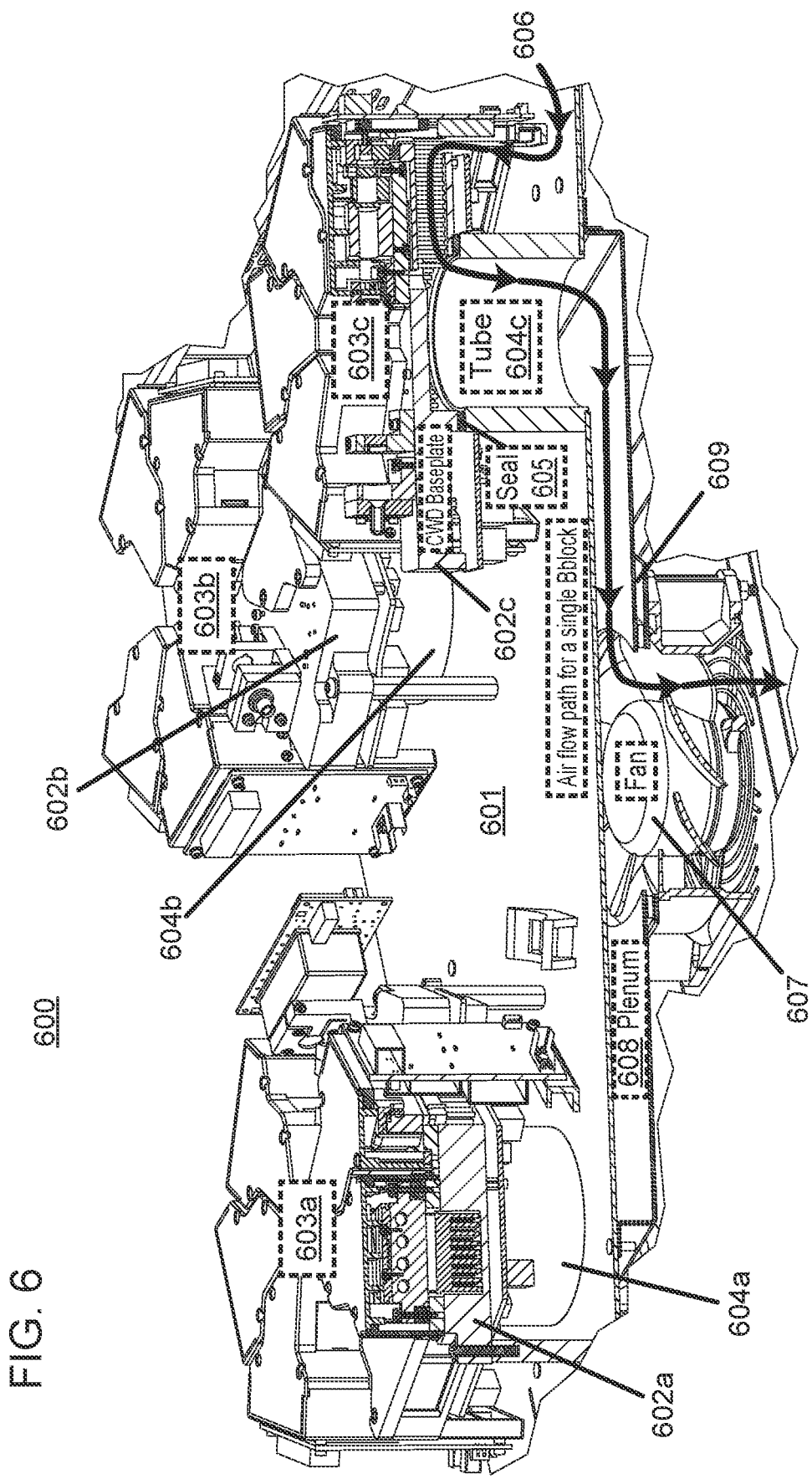
FIG. 6 depicts a substrate upon which a plurality of light detection systems is co-located.

FIG. 6 depicts a particle analysis system according to certain embodiments of the invention. As shown in FIG. 6, particle analysis system 600 includes light detection systems 603a, 603b and 603c co-located on a substrate 601. Each of light detection systems 603a-603c includes a baseplate (602a, 602b and 602c, respectively). Tubes 604a-604c gaseously connect light detection systems 603a-603c, respectively, to plenum 608 positioned within substrate 601. As shown with respect to light detection system 603c, a seal 605 prevents air from leaking out of the temperature regulation system. Fan 607 generates negative pressure within plenum and thereby pulls air through each light detection module within each of light detection systems 603a-603c, as exemplified by air 606 traveling through light detection system 603c along the path denoted by arrows. The system 600 additionally includes elastomeric dampeners configured to absorb shock and vibrations produced by fan 607. The embodiment shown in FIG. 6 illustrates a system in which there are more light detection modules than fans, e.g., where a single fan is employed in cooling a plurality of light detection modules, such as 2 or more, e.g., 3 or more, 4 or more, 5 or more, including 6 or more light detection modules.

As discussed above, particle analysis systems additionally include a flow cell. As discussed herein, a "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some embodiments, the flow cell is a stream-in-air flow cell in which light interrogation of the particles occurs outside of the flow cell (i.e., in free space).

In some cases, the flow stream is configured for irradiation with light from a light source at an interrogation point. The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. The "interrogation point" discussed herein refers to a region within the flow cell in which the particle is irradiated by light from the light source, e.g., for analysis. The size of the interrogation point may vary as desired. For example, where 0 µm represents the axis of light emitted by the light source, the interrogation point may range from −100 µm to 100 µm, such as −50 µm to 50 µm, such as −25 µm to 40 µm, and including −15 µm to 30 µm.

After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

As discussed above, aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 μm or greater, such as 0.5 μm or greater such as 1 μm or greater, such as 10 μm or greater, such as 100 μm or greater, such as 500 μm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

As discussed above, aspects of the subject flow cytometers include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec to 2500 μL/sec, such as 50 μL/sec to 1000 μL/sec, and including 75 μL/sec or more to 750 μL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5): 502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 7:
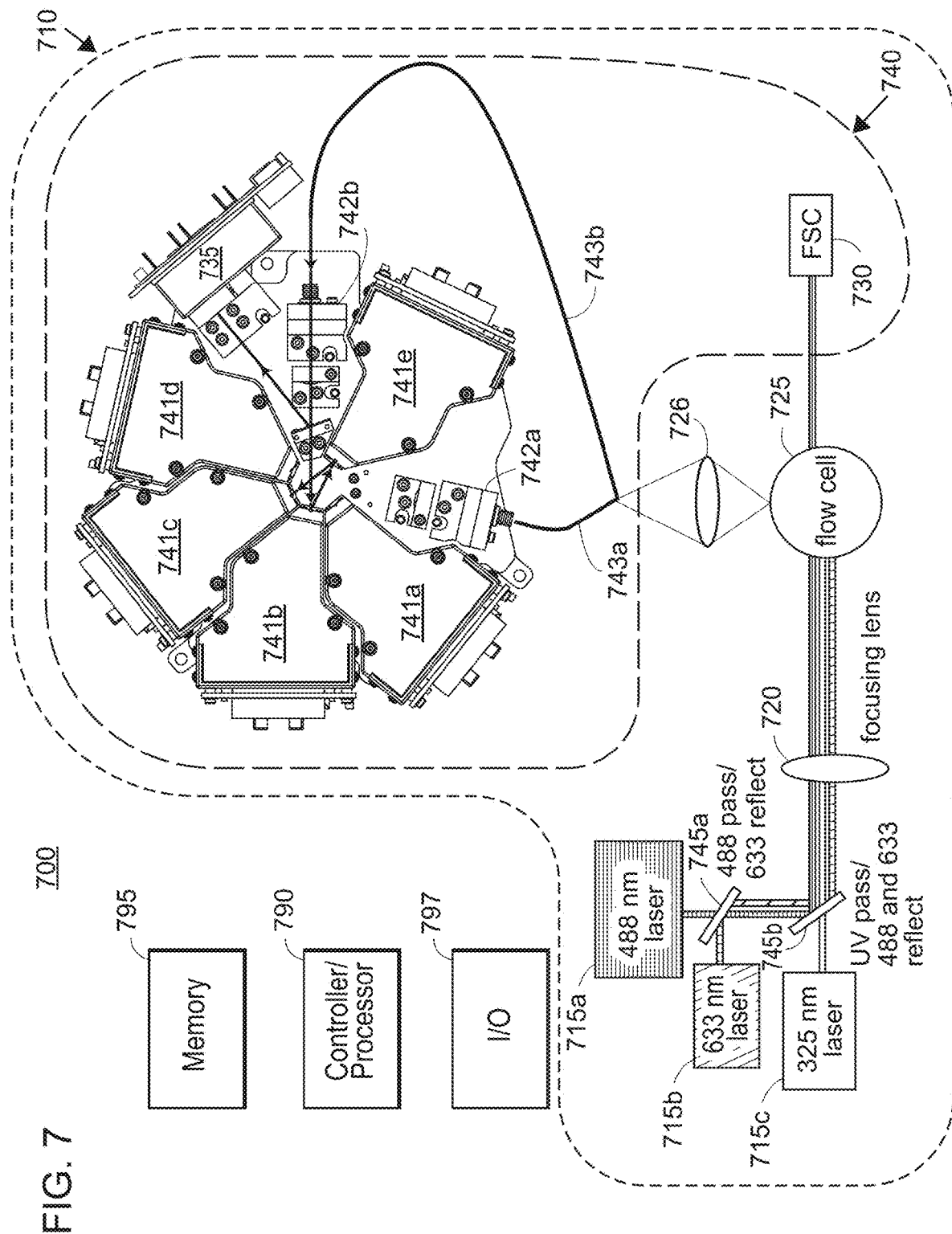
FIG. 7 depicts a functional block diagram of a flow cytometric system according to certain embodiments.

FIG. 7 shows a system 700 for flow cytometry in accordance with an illustrative embodiment of the present invention. The system 700 includes a flow cytometer 710, a controller/processor 790 and a memory 795. The flow cytometer 710 includes one or more excitation lasers 715a-715c, a focusing lens 720, a flow cell 725, a forward-scatter photodetector 730, a side-scatter photodetector 735, a collection lens 726, and light detection system 740.

The excitation lasers 715a-c emit light in the form of a laser beam. The wavelengths of the laser beams emitted from excitation lasers 715a-715c are 488 nm, 633 nm, and 325 nm, respectively, in the example system of FIG. 7. The laser beams are first directed through one or more of beam splitters 745a and 745b. Beam splitter 745a transmits light at 488 nm and reflects light at 633 nm. Beam splitter 745b transmits UV light (light with a wavelength in the range of 10 to 400 nm) and reflects light at 488 nm and 633 nm.

The laser beams are then directed to a focusing lens 720, which focuses the beams onto the portion of a fluid stream where particles of a sample are located, within the flow cell 725. The flow cell 725 is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. Light detection system 740 includes light detection modules 741a-741e. The fluorescence emissions as well as the diffracted light, refracted light, reflected light, and scattered light may be routed to one or more of the forward-scatter photodetector 730, the side-scatter photodetector 735, and light detection modules 741a-741e. Optical collection components (i.e., fiber optic cables) 743a and 743b convey particle-modulated light from received from flow cell 725 to light receivers 742a and 742b, respectively (e.g., as described above).

The forward-scatter photodetector 730 is positioned slightly off axis from the direct beam through the flow cell and is configured to detect diffracted light, the excitation light that travels through or around the particle in mostly a forward direction. The intensity of the light detected by the forward-scatter photodetector is dependent on the overall size of the particle. The forward-scatter photodetector can include a photodiode. The side-scatter photodetector 735 is configured to detect refracted and reflected light from the surfaces and internal structures of the particle that tends to increase with increasing particle complexity of structure. The side-scatter photodetector 735 can include photomultiplier tubes. The signals detected at the forward-scatter photodetector 730, the side-scatter photodetector 735 and the photodetectors in light detection modules 741a-741e can be converted to electronic signals (voltages) by the photodetectors. This data can provide information about the sample.

One of skill in the art will recognize that a flow cytometer in accordance with an embodiment of the present invention is not limited to the flow cytometer depicted in FIG. 7, but can include any flow cytometer known in the art. For example, a flow cytometer may have any number of lasers, beam splitters, filters, and photodetectors at various wavelengths and in various different configurations.

During use, cytometer operation is controlled by a controller/processor 790, and the measurement data from the photodetectors can be stored in the memory 795 and processed by the controller/processor 790. Although not shown explicitly, the controller/processor 790 is coupled to the photodetectors to receive the output signals therefrom, and may also be coupled to electrical and electromechanical components of the flow cytometer 710 to control the lasers, fluid flow parameters, and the like. Input/output (I/O) capabilities 797 may be provided also in the system. The memory 795, controller/processor 790, and I/O 797 may be entirely provided as an integral part of the flow cytometer 710. In such an embodiment, a display may also form part of the I/O capabilities 797 for presenting experimental data to users of the cytometer 710. Alternatively, some or all of the memory 795 and controller/processor 790 and I/O capabilities may be part of one or more external devices such as a general purpose computer. In some embodiments, some or all of the memory 795 and controller/processor 790 can be in wireless or wired communication with the cytometer 710. The controller/processor 790 in conjunction with the memory 795 and the I/O 797 can be configured to perform various functions related to the preparation and analysis of a flow cytometer experiment.

Different fluorescent molecules used for a flow cytometer experiment will emit light in their own characteristic wavelength bands. The particular fluorescent labels used for an experiment and their associated fluorescent emission bands may be selected to generally coincide with the filter windows of the photodetectors. The I/O 797 can be configured to receive data regarding a flow cytometer experiment having a panel of fluorescent labels and a plurality of cell populations having a plurality of markers, each cell population having a subset of the plurality of markers. The I/O 797 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 795. The controller/processor 790 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 8:
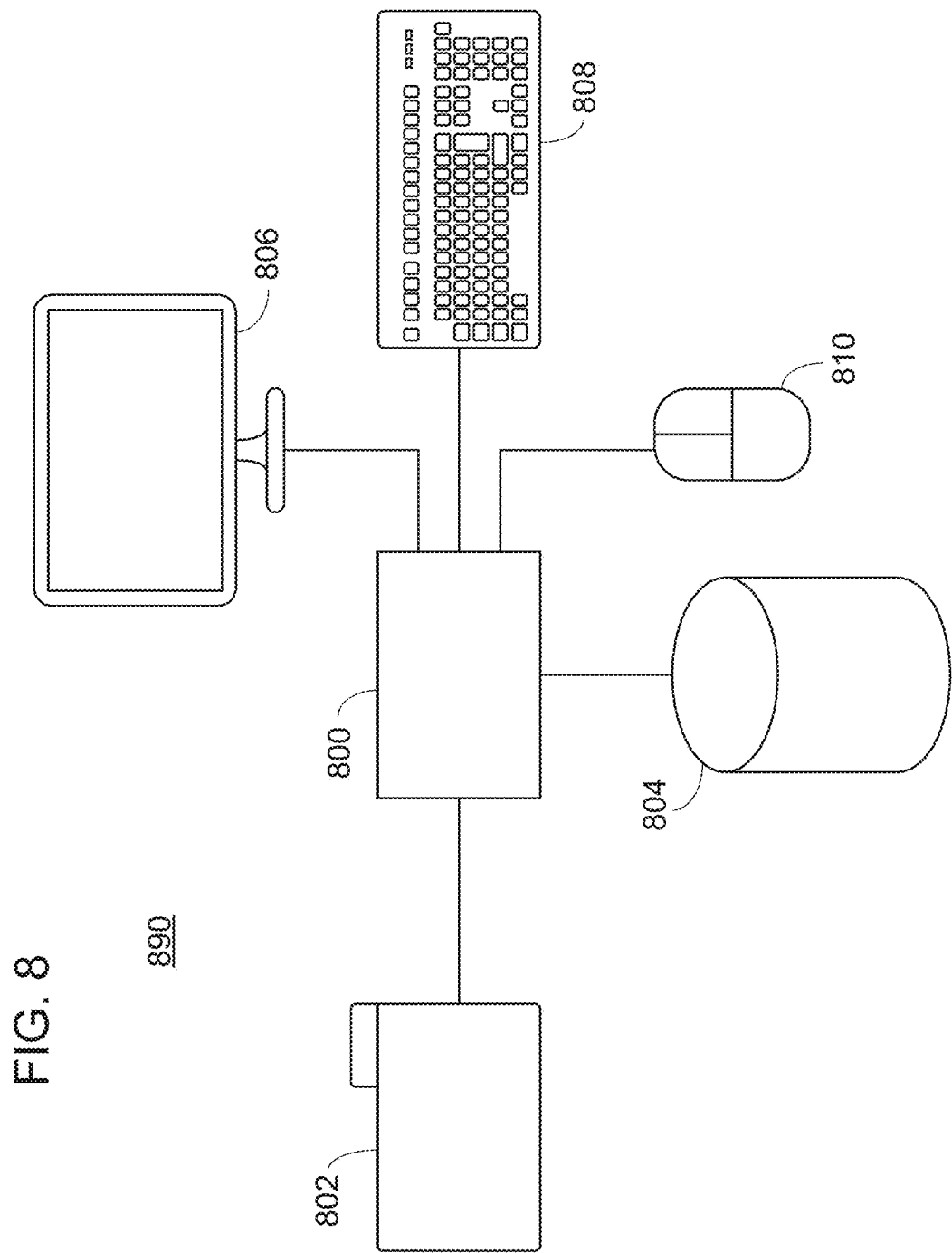
FIG. 8 depicts a sorting control system according to certain embodiments.

FIG. 8 shows a functional block diagram for one example of a sorting control system 890, a comprising processor 800, for analyzing and displaying biological events. A processor 800 can be configured to implement a variety of processes for controlling graphic display of biological events.

A flow cytometer or sorting system 802 can be configured to acquire biological event data. For example, a flow cytometer can generate flow cytometric event data (e.g., particle-modulated light data). The flow cytometer 802 can be configured to provide biological event data to the processor 800. A data communication channel can be included between the flow cytometer 802 and the processor 800. The biological event data can be provided to the processor 800 via the data communication channel.

The processor 800 can be configured to receive biological event data from the flow cytometer 802. The biological event data received from the flow cytometer 802 can include flow cytometric event data. The processor 800 can be configured to provide a graphical display including a first plot of biological event data to a display device 806. The processor 800 can be further configured to render a region of interest as a gate around a population of biological event data shown by the display device 806, overlaid upon the first plot, for example. In some embodiments, the gate can be a logical combination of one or more graphical regions of interest drawn upon a single parameter histogram or bivariate plot. In some embodiments, the display can be used to display particle parameters or saturated photodetector data.

The processor 800 can be further configured to display the biological event data on the display device 806 within the gate differently from other events in the biological event data outside of the gate. For example, the processor 800 can be configured to render the color of biological event data contained within the gate to be distinct from the color of biological event data outside of the gate. The display device 806 can be implemented as a monitor, a tablet computer, a smartphone, or other electronic device configured to present graphical interfaces.

The processor 800 can be configured to receive a gate selection signal identifying the gate from a first input device. For example, the first input device can be implemented as a mouse 810. The mouse 810 can initiate a gate selection signal to the processor 800 identifying the gate to be displayed on or manipulated via the display device 806 (e.g., by clicking on or in the desired gate when the cursor is positioned there). In some implementations, the first device can be implemented as the keyboard 808 or other means for providing an input signal to the processor 800 such as a touchscreen, a stylus, an optical photodetector, or a voice recognition system. Some input devices can include multiple inputting functions. In such implementations, the inputting functions can each be considered an input device. For example, as shown in FIG. 8, the mouse 810 can include a right mouse button and a left mouse button, each of which can generate a triggering event.

The triggering event can cause the processor 800 to alter the manner in which the data is displayed, which portions of the data is actually displayed on the display device 806, and/or provide input to further processing such as selection of a population of interest for particle sorting.

In some embodiments, the processor 800 can be configured to detect when gate selection is initiated by the mouse 810. The processor 800 can be further configured to automatically modify plot visualization to facilitate the gating process. The modification can be based on the specific distribution of biological event data received by the processor 800. In some embodiments, the processor 800 expands the first gate such that a second gate is generated (e.g., as discussed above).

The processor 800 can be connected to a storage device 804. The storage device 804 can be configured to receive and store biological event data from the processor 800. The storage device 804 can also be configured to receive and store flow cytometric event data from the processor 800. The storage device 804 can be further configured to allow retrieval of biological event data, such as flow cytometric event data, by the processor 800.

The display device 806 can be configured to receive display data from the processor 800. The display data can comprise plots of biological event data and gates outlining sections of the plots. The display device 806 can be further configured to alter the information presented according to input received from the processor 800 in conjunction with input from the flow cytometer 802, the storage device 804, the keyboard 808, and/or the mouse 810.

In some implementations the processor 800 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 9A:
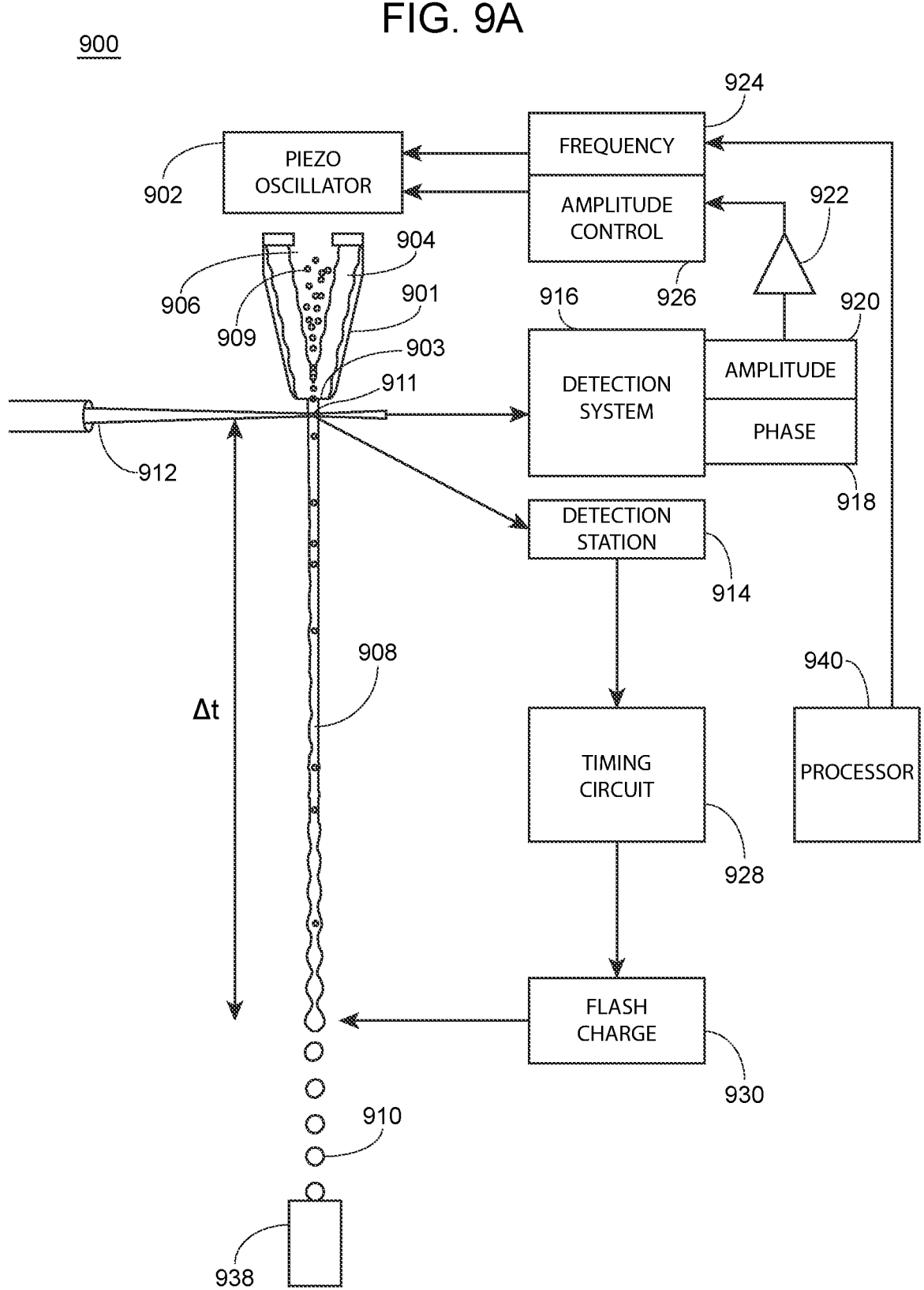
FIG. 9A-B depict schematic drawings of a particle sorter system according to certain embodiments.

FIG. 9A is a schematic drawing of a particle sorter system 900 (e.g., the flow cytometer 902) in accordance with one embodiment presented herein. In some embodiments, the particle sorter system 900 is a cell sorter system. As shown in FIG. 9A, a drop formation transducer 902 (e.g., piezo-oscillator) is coupled to a fluid conduit 901, which can be coupled to, can include, or can be, a nozzle 903. Within the fluid conduit 901, sheath fluid 904 hydrodynamically focuses a sample fluid 906 comprising particles 909 into a moving fluid column 908 (e.g. a stream). Within the moving fluid column 908, particles 909 (e.g., cells) are lined up in single file to cross a monitored area 911 (e.g., where laser-stream intersect), irradiated by an irradiation source 912 (e.g., a laser). Vibration of the drop formation transducer 902 causes moving fluid column 908 to break into a plurality of drops 910, some of which contain particles 909.

In operation, a detection station 914 (e.g., an event detector) identifies when a particle of interest (or cell of interest) crosses the monitored area 911. Detection station 914 feeds into a timing circuit 928, which in turn feeds into a flash charge circuit 930. At a drop break off point, informed by a timed drop delay (Δt), a flash charge can be applied to the moving fluid column 908 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 9A, the drops can be collected in a drain receptacle 938.

A detection system 916 (e.g. a drop boundary detector) serves to automatically determine the phase of a drop drive signal when a particle of interest passes the monitored area 911. An exemplary drop boundary detector is described in U.S. Pat. No. 7,679,039, which is incorporated herein by reference in its entirety. The detection system 916 allows the instrument to accurately calculate the place of each detected particle in a drop. The detection system 916 can feed into an amplitude signal 920 and/or phase 918 signal, which in turn feeds (via amplifier 922) into an amplitude control circuit 926 and/or frequency control circuit 924. The amplitude control circuit 926 and/or frequency control circuit 924, in turn, controls the drop formation transducer 902. The amplitude control circuit 926 and/or frequency control circuit 924 can be included in a control system.

In some implementations, sort electronics (e.g., the detection system 916, the detection station 914 and a processor 940) can be coupled with a memory configured to store the detected events and a sort decision based thereon. The sort decision can be included in the event data for a particle. In some implementations, the detection system 916 and the detection station 914 can be implemented as a single detection unit or communicatively coupled such that an event measurement can be collected by one of the detection system 916 or the detection station 914 and provided to the non-collecting element.

Figure 9B:
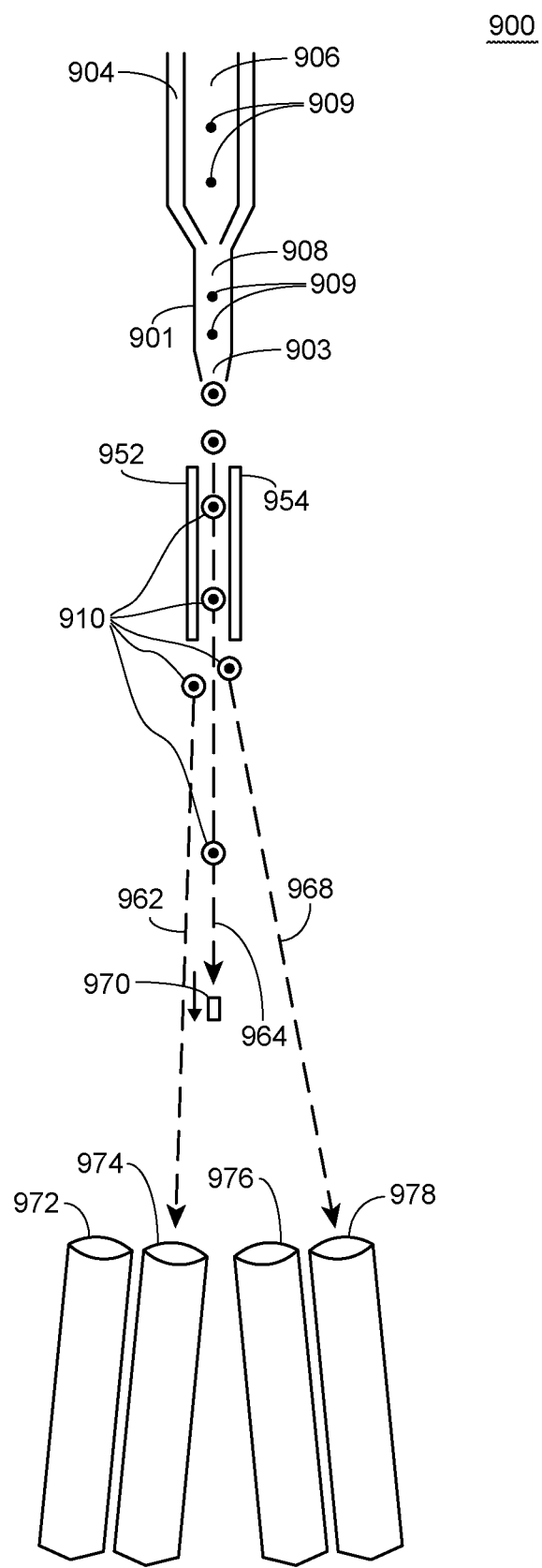

FIG. 9B is a schematic drawing of a particle sorter system, in accordance with one embodiment presented herein. The particle sorter system 900 shown in FIG. 9B, includes deflection plates 952 and 954. A charge can be applied via a stream-charging wire in a barb. This creates a stream of droplets 910 containing particles 909 for analysis. The particles can be illuminated with one or more light sources (e.g., lasers) to generate light scatter and fluorescence information. The information for a particle is analyzed such as by sorting electronics or other detection system (not shown in FIG. 9B). The deflection plates 952 and 954 can be independently controlled to attract or repel the charged droplet to guide the droplet toward a destination collection vessel (e.g., one of 972, 974, 976, or 978). As shown in FIG. 9B, the deflection plates 952 and 954 can be controlled to direct a particle along a first path 962 toward the vessel 974 or along a second path 968 toward the vessel 978. If the particle is not of interest (e.g., does not exhibit scatter or illumination information within a specified sort range), deflection plates may allow the particle to continue along a flow path 964. Such uncharged droplets may pass into a waste receptacle such as via aspirator 970.

The sorting electronics can be included to initiate collection of measurements, receive fluorescence signals for particles, and determine how to adjust the deflection plates to cause sorting of the particles. Example implementations of the embodiment shown in FIG. 9B include the BD FACSAria™ line of flow cytometers commercially provided by Becton, Dickinson and Company (Franklin Lakes, NJ).

Baseplates

Aspects of the disclosure additionally include baseplates for mounting a light detection system (e.g., such as those described above or those described in application Ser. No. 17/159,453; the disclosure of which is herein incorporated by reference). Baseplates of interest include a stage for mounting a light receiver configured to receive a beam of light, a plurality of recesses for fixing a plurality of light detection modules in rigid alignment relative to the stage and a heat dissipation opening positioned within each recess. In embodiments, the recesses are arranged around a central point and each heat dissipation opening is positioned within each recess at a location proximal to the central point.

As discussed above, the subject baseplates include a stage for mounting a light receiver. In embodiments, the stage is a flat surface of the baseplate upon which a light receiver can be secured. In additional embodiments, the stage is configured to additionally mount a beam adjuster. The light receiver may be secured to the stage via any convenient mechanism. For example, in some cases, the stage includes one or more dowel pins for securing the light receiver and/or beam adjuster. In additional cases, the stage includes one or more holes (e.g., threaded holes) configured to receive a protrusion from the light receiver and/or beam adjuster. The baseplates described herein may include any suitable number of stages. For example, in some embodiments, baseplates include a single stage. In other embodiments, baseplates include a first and a second stage configured to mount first and second light receivers, respectively. In still further embodiments, baseplates include first, second and third stages configured to mount first, second and third light receivers, respectively. In some embodiments, the first and/or second stage is configured to have a side-scattered light detector and side-scattered light separator positioned thereon. In such embodiments, the first and/or second stage may include one or more dowel pins and/or threaded holes for affixing the side-scattered light detector and side-scattered light separator thereto.

Baseplates of interest further include a plurality of recesses for fixing a plurality of light detection modules in rigid alignment relative to the stage. The recesses described herein are depressions within the baseplate that possess a shape that is complementary to the shape of the light detection modules. By "rigid alignment" it is meant that the recesses are shaped and sized so that light detection modules associated therewith are fixed in place. For example, the recesses possess dimensions that approximate the dimensions of at least a portion of the light detection modules such that the light detection modules fit snugly within the recesses. In other words, light detection modules placed within the subject recesses are prevented from shifting and thereby introducing noise into the signals produced by the photodetectors within the light detection modules. In certain embodiments, the subject recesses include one or more dowel pins located adjacent to the recesses. Dowel pins of interest are configured to immobilize the light detection modules relative to the baseplate. In additional cases, the baseplate includes one or more holes (e.g., threaded holes) adjacent to the recesses configured to receive a protrusion from a light detection module. In some embodiments, the subject recesses are sufficient to prevent the position of the light detection modules from varying by 1 µm or more, such as 5 µm or more, such as 10 µm or more, such as 15 µm or more, such as 20 µm or more and including 25 µm or more. Baseplates may include any suitable number of recesses, such as where the number of recesses ranges from 2 to 8, such as 2 to 7, and including 2 to 5. In certain cases, the subject baseplates include 5 recesses.

Recesses in the baseplate disclosed herein may have any convenient arrangement with respect to each other and the one or more stages. In some versions, the recesses are arranged in a geometric (e.g., polygonal) configuration around a central point. For example, the recesses may be arranged in a triangular configuration, hexagonal configuration, heptagonal configuration, octagonal configuration, nonagonal configuration, decagonal configuration, dodecagonal configuration, circular configuration, oval configuration as well as irregular shaped configurations. In certain cases, the recesses are arranged in a heptagonal configuration. Where the recesses are arranged in a geometric configuration, said geometric configuration includes the recesses and the stages. In other words, where the baseplate is conceptualized as a pie, each recess and stage may be thought of as a slice of the pie. In one example, the baseplate includes 2 stages and 5 recesses arranged in a heptagonal configuration. In another example, the baseplate includes 6 recesses and 1 stage arranged in a heptagonal configuration.

The subject baseplates additionally include heat dissipation openings positioned within each recess. As discussed herein, the heat dissipation openings are holes positioned in the recesses at locations proximal to the central point of the baseplate. The heat dissipation openings are configured such that, when the light detection modules are located within the recesses, cool air may flow through a space located between the light detection module and the bottom of the recess (i.e., the heat sink). Heat from the light detection module is transferred to the air. The warmed air subsequently exits through the light heat dissipation opening. In some versions, the heat dissipation openings are gaseously connected to a cutout configured to direct heat pooled from each light detection module away from the light detection system. In embodiments, the cutout is a hole located in the central portion of the baseplate. In certain instances, the baseplate additionally includes a lightening feature. In such instances, the lightening feature may include a depression in a portion of the baseplate. For example, the lightening feature may be located on the back side of the base plate, such as underneath the one or more stages. In some embodiments, the depression constitutes a removal of unnecessary material from the baseplate.

Figure 10A:
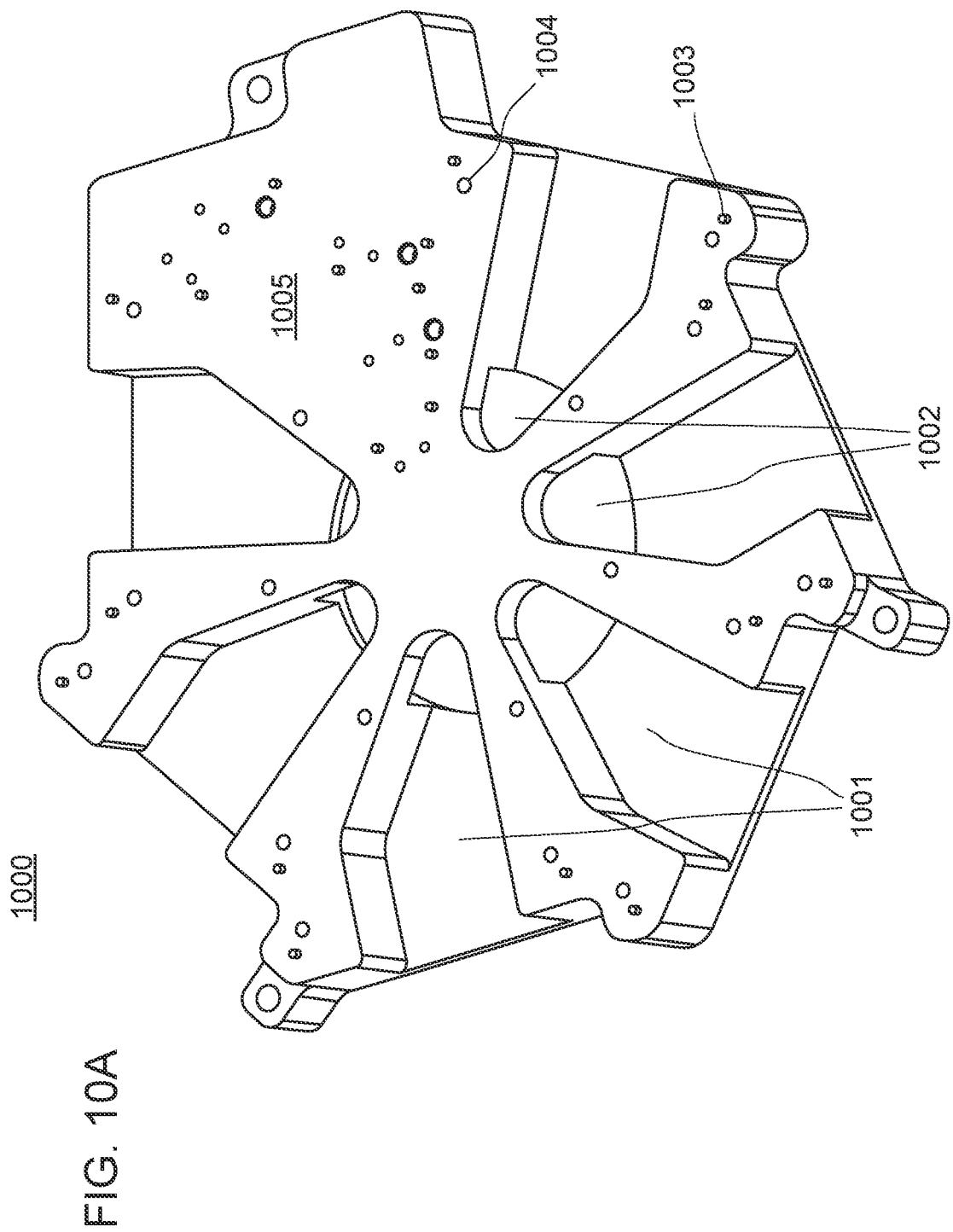

FIG. 10A-B depict a top view and a bottom view, respectively, of a baseplate according to certain embodiments of the invention. As shown in FIG. 10A, the top of baseplate 1000 includes a plurality of (i.e., 5) recesses 1001. Each recess in the plurality of recesses 1001 includes a heat dissipation opening 1002. Baseplate 1000 additionally possesses a stage 1005 for mounting a light receiver. Dowel pins 1003 are pressed into the top side of the baseplate 1000 to precisely align the light detection modules and light receiver when they are installed. Threaded holes 1004 also allow for the attachment of light detection modules and light receivers. As shown in FIG. 10B, the back side of baseplate 1000 includes a cutout 1006 gaseously connected to each heat dissipation opening as well as threaded holes 1004 for attaching a printed circuit board to the baseplate 1000. Lightening feature 1007 is present to remove excess material that does not contribute to the stiffness of the baseplate 1000.

The baseplate may include any convenient material. In certain instances, the baseplate includes one or more metal components including, for example, aluminum, titanium, brass, iron, lead, nickel, steel (e.g., stainless steel), copper, tin as well as combinations and alloys thereof. In some embodiments, the baseplate includes an aluminum alloy (e.g., 6061-T6 aluminum alloy). In additional embodiments, the substrate includes one or more rigid plastic materials such as, for example, polycarbonates, polyvinyl chloride (PVC), polyurethanes, polyethers, polyamides, polyimides, among other polymeric plastic materials.

The baseplate may include any suitable dimensions. For example, in some cases, the baseplate possesses a diameter ranging from 150 mm to 250 mm. In some embodiments, the baseplate possesses a diameter of 200 mm. The baseplate may, in some versions, include a thickness ranging from 15 mm to 25 mm (i.e., as measured from the top surface of the baseplate to the bottom surface of the baseplate). In certain cases, the baseplate possesses a thickness of 20 mm. As such, in some embodiments, the baseplate possesses a thickness to diameter ratio ranging from 1:5 to 1:10. In some cases, the thickness to diameter ratio is 1:10. In some instances, the disclosed thickness to diameter ratios confer a stiffness to the baseplate that is sufficient to maintain the optical alignment of the light detection modules within the light detection module. Stiffness is of interest in the mounting of optics where the angles and distances between optical elements are precise. In some cases, is desirable to keep the opto-mechanical design as stiff as reasonably possible to prevent resonance from affecting signal measurement. The stiffness of the baseplate is largely a function of thickness because the second moment of area is proportional to the cube root of thickness:

$$I = \frac{Dh^3}{12}$$

where D is the baseplate diameter (m), h is baseplate thickness (m), and I is the second moment of area (m$^4$). Using the assumption that the baseplate is a cantilever beam, the deflection of the beam is proportional to the second moment of area (I):

$$dmax = \frac{FL^3}{3EI}$$

where F is force (N), L is length (m), E is Young's modulus (GPa), I is inertia (m$^4$) and dmax (m) is the maximum deflection. The stiffness of the beam may subsequently be determined as follows:

$$k = \frac{F}{dmax}$$

where k is stiffness (N/m).

Lower stiffness is associated with a lower natural frequency and greater displacement during resonance. Conventional wisdom among opto-mechanical designers is that a threshold of 200 Hz is the minimum required to achieve effective design for analysis of micron or nanometer sized objects. Low frequencies are considered undesirable because the light energy spends more time not focused on a sensor target compared to higher frequencies. A higher signal frequency can be more accurately averaged over an equivalent time period because there are more samples available. As such, for a given driving force, there will be a greater resultant amplitude in the resonance when stiffness is lower compared to when it is higher. This amplitude displaces the optics from precise alignment thereby causing beams to miss their intended targets.

Figure 11B:
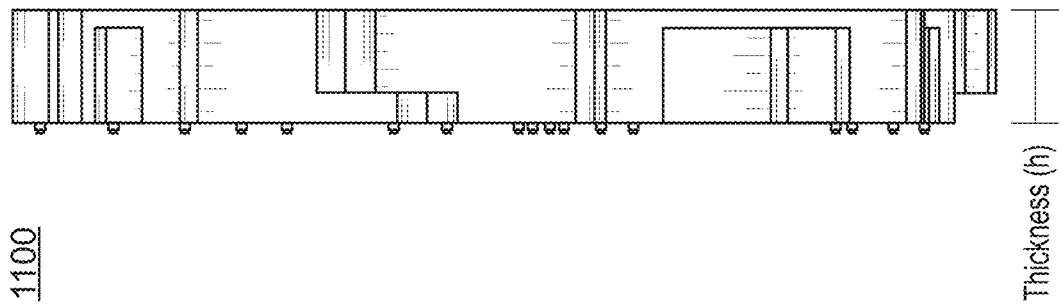
FIG. 11A-B illustrate the dimensions of a baseplate.
Figure 11A:
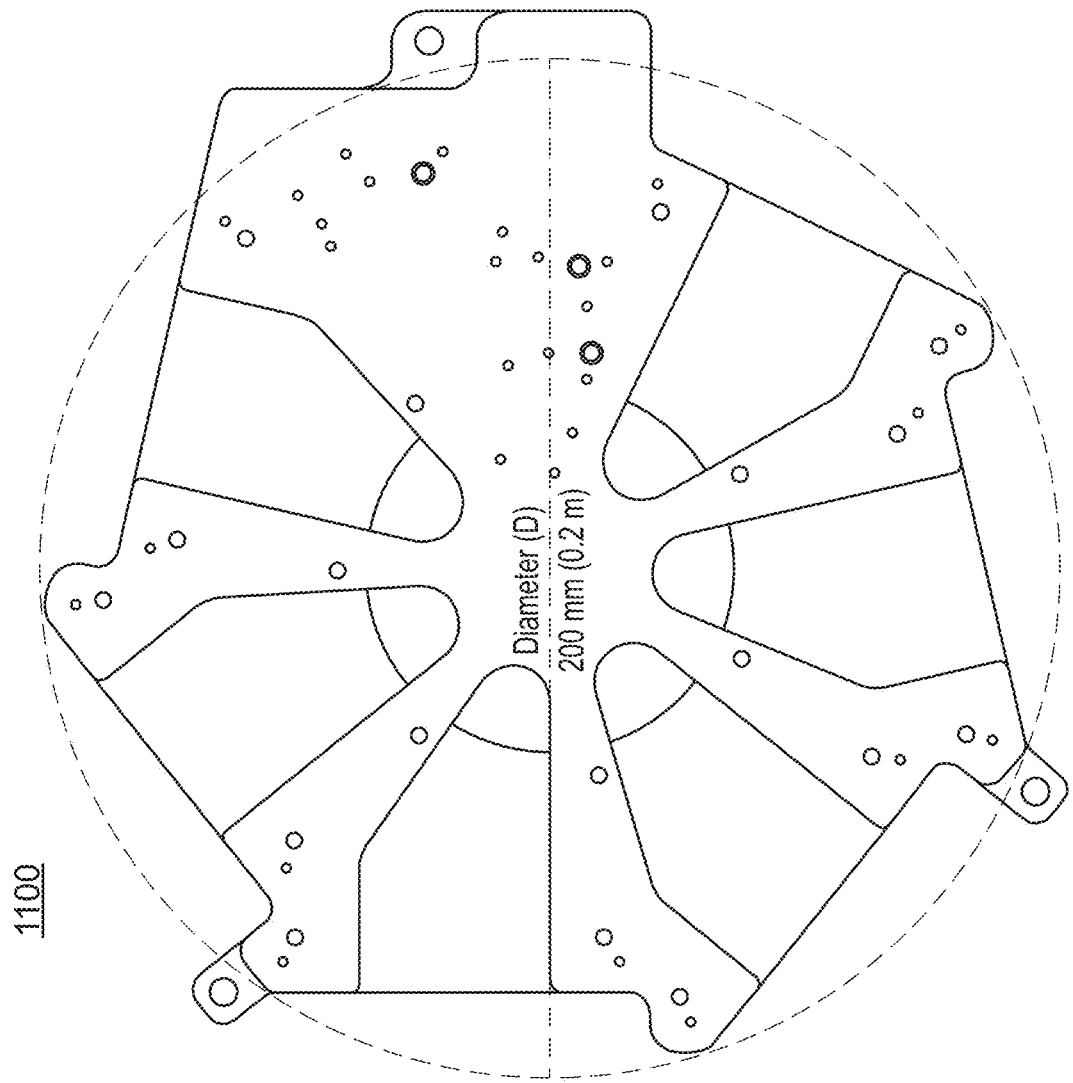

FIG. 11A-B depict the measurement of diameter and thickness for a given baseplate 1100 according to an embodiment.

Figure 12A:
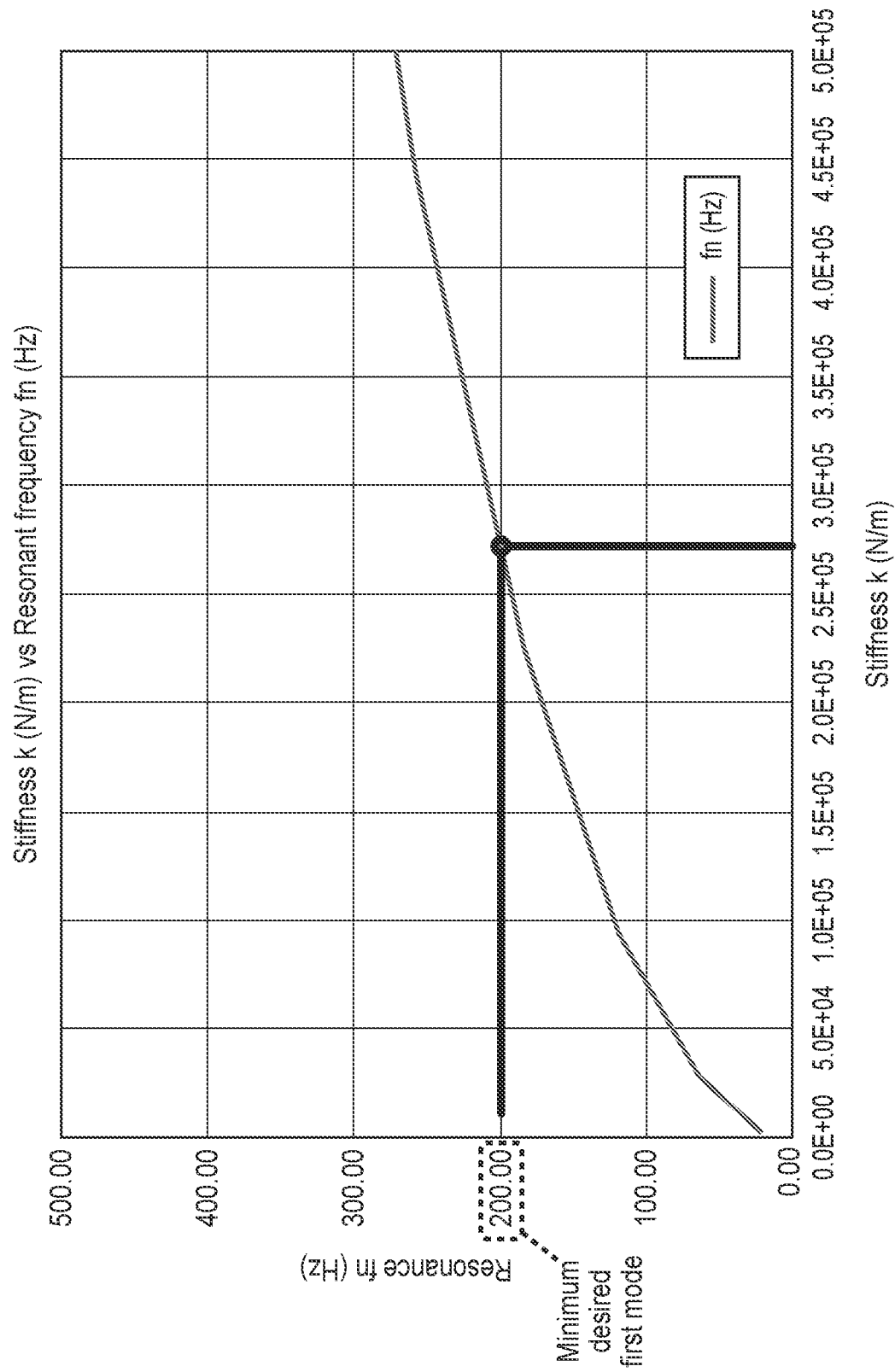
FIG. 12A-B include graphs illustrating how baseplate thickness is related to stiffness and resonant frequency.
Figure 12B:
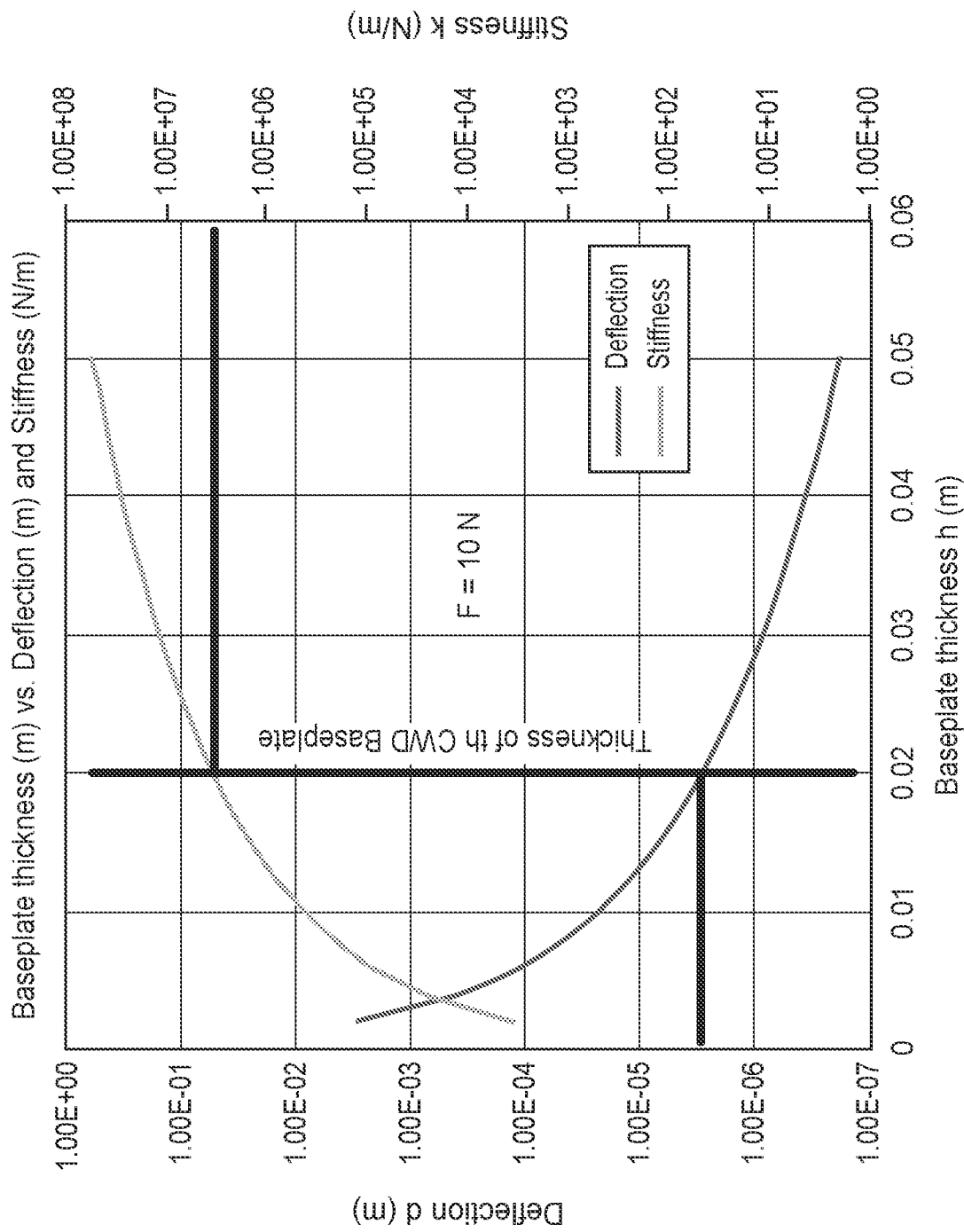

FIG. 12A-B present graphical representation of the determination of an ideal thickness to diameter ratio. FIG. 12A plots stiffness k (N/m) vs resonant frequency (Hz). To achieve the minimum desired first mode of natural frequency (resonance), FIG. 12A demonstrates that one must maintain a stiffness of about 2.8E+05 N/m. FIG. 12B demonstrates that a thickness of 20 mm provides an approximate stiffness of 5E+06 N/m. However, because the relationship of stiffness to thickness is logarithmic and not linear, when the thickness is reduced to 10 mm, the stiffness is reduced to an inadequate level of roughly 7E+05 N/m.

Figure 13A:
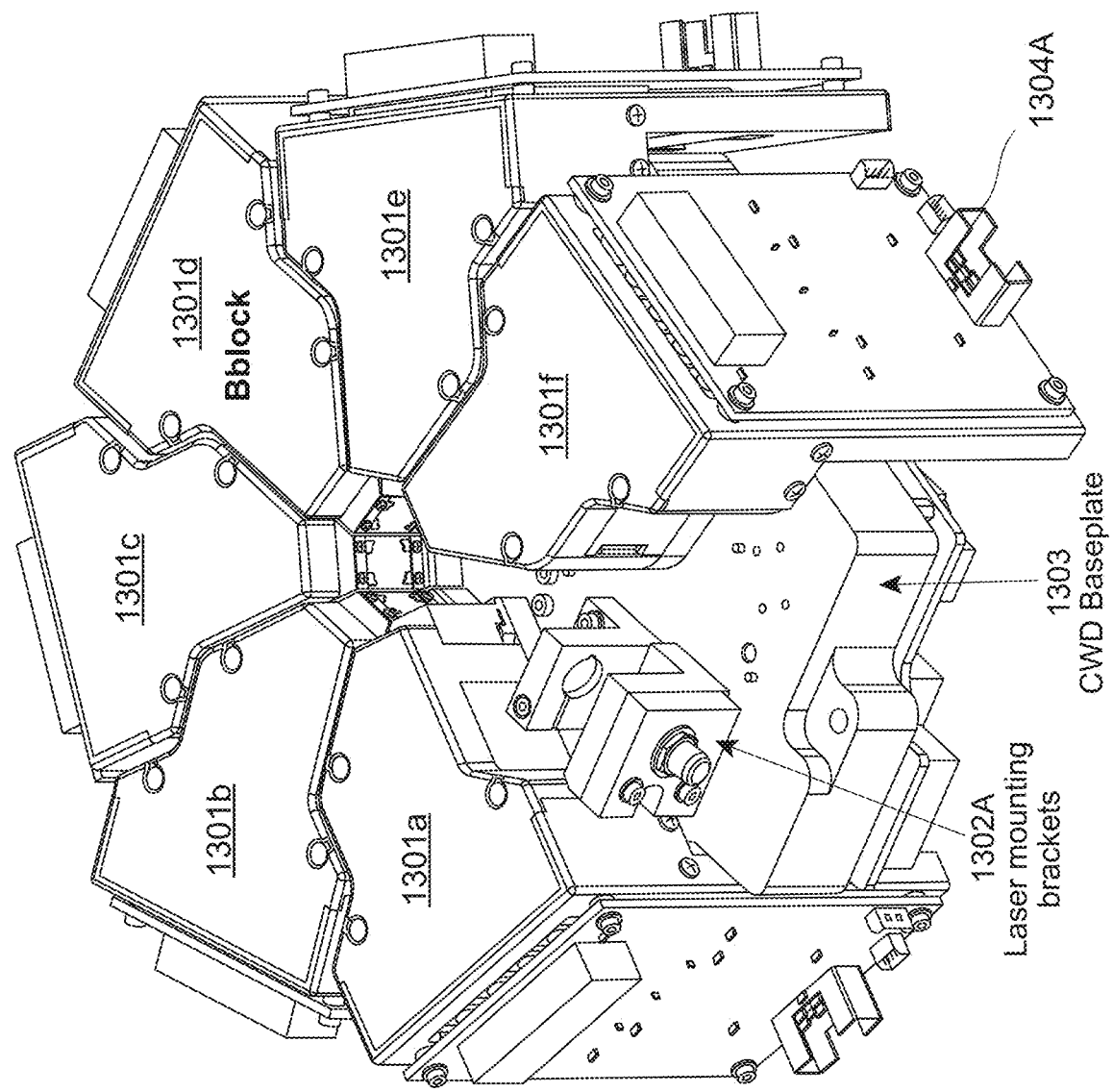
FIG. 13A-C depict a baseplate having 6 light detection modules attached thereto.
Figure 13B:
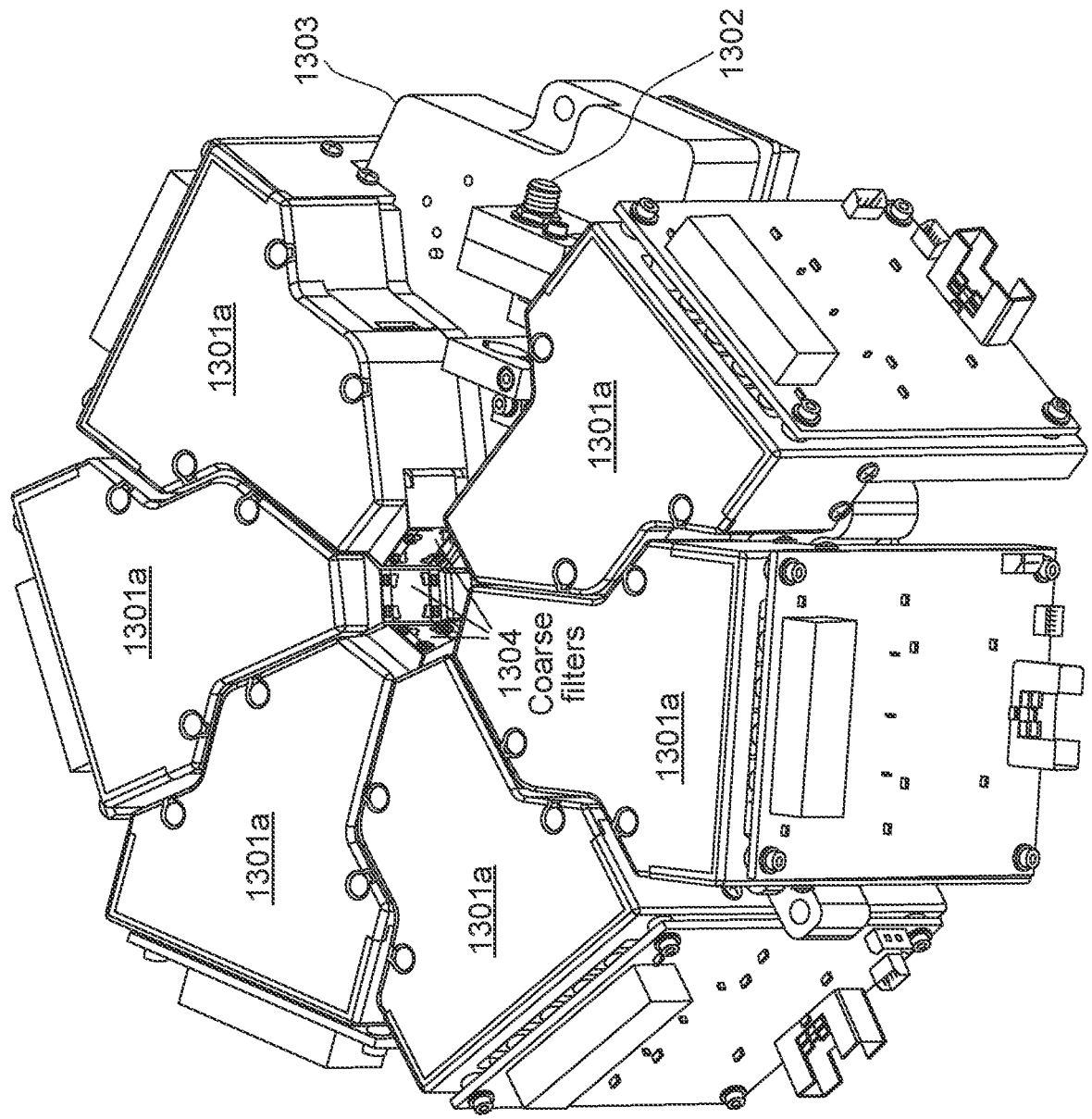
Figure 13C:
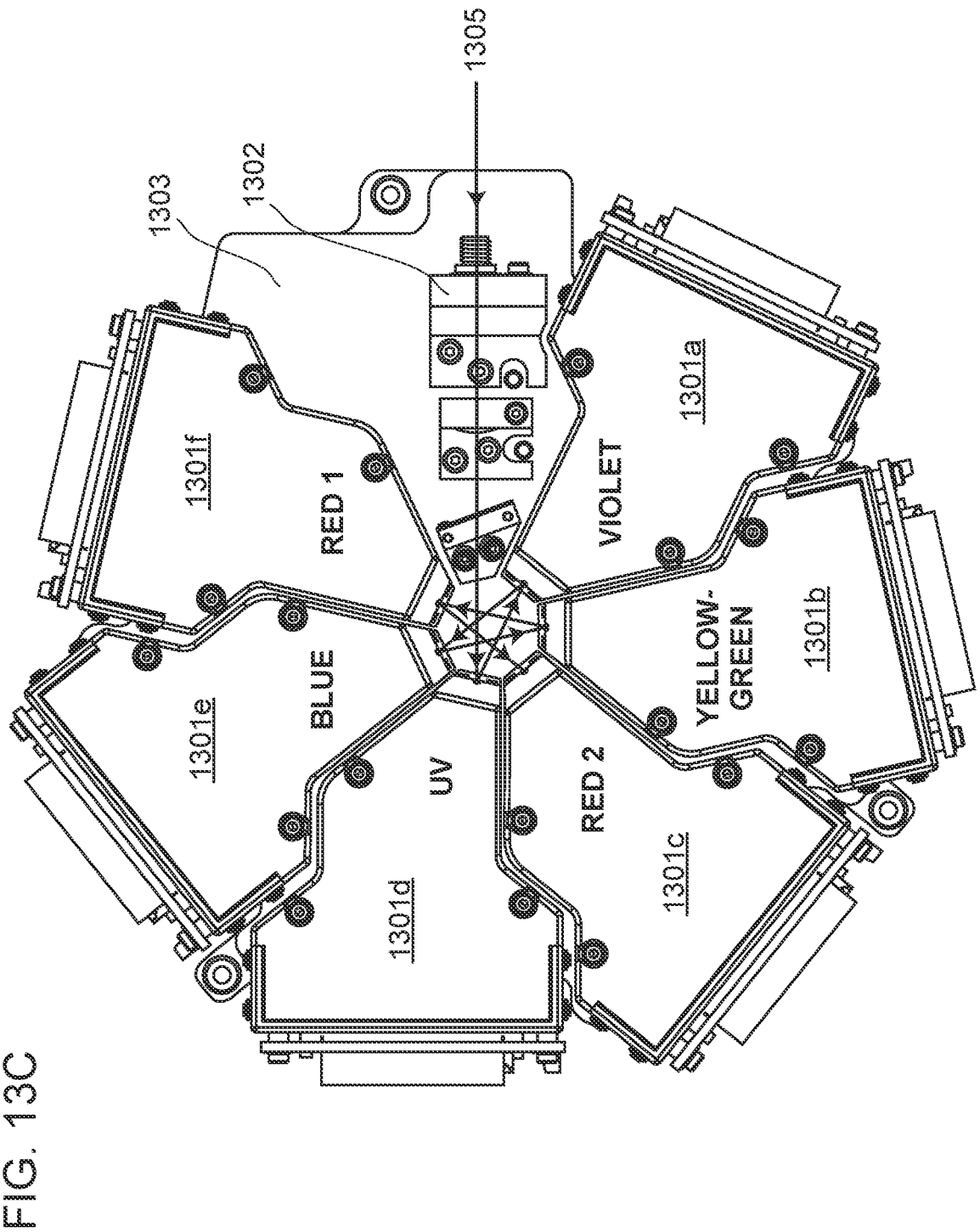

FIG. 13A-C depict alternate views of a baseplate according to certain embodiments of the invention. Baseplate 1303 includes six recesses rigidly aligning light detection modules 1301a-1301f relative to a single light receiver 1302 as well as laser mounting bracket 1302A. Each of light detection modules 1301a-1301f is in optical communication with one of wavelength separators 1304. As shown in FIG. 13A, printed circuit boards 1304A are attached to light detection modules 1301a-1301f. FIG. 13C depicts the path of a beam 1305 through the light detection modules rigidly aligned by baseplate 1303.

Figure 14:
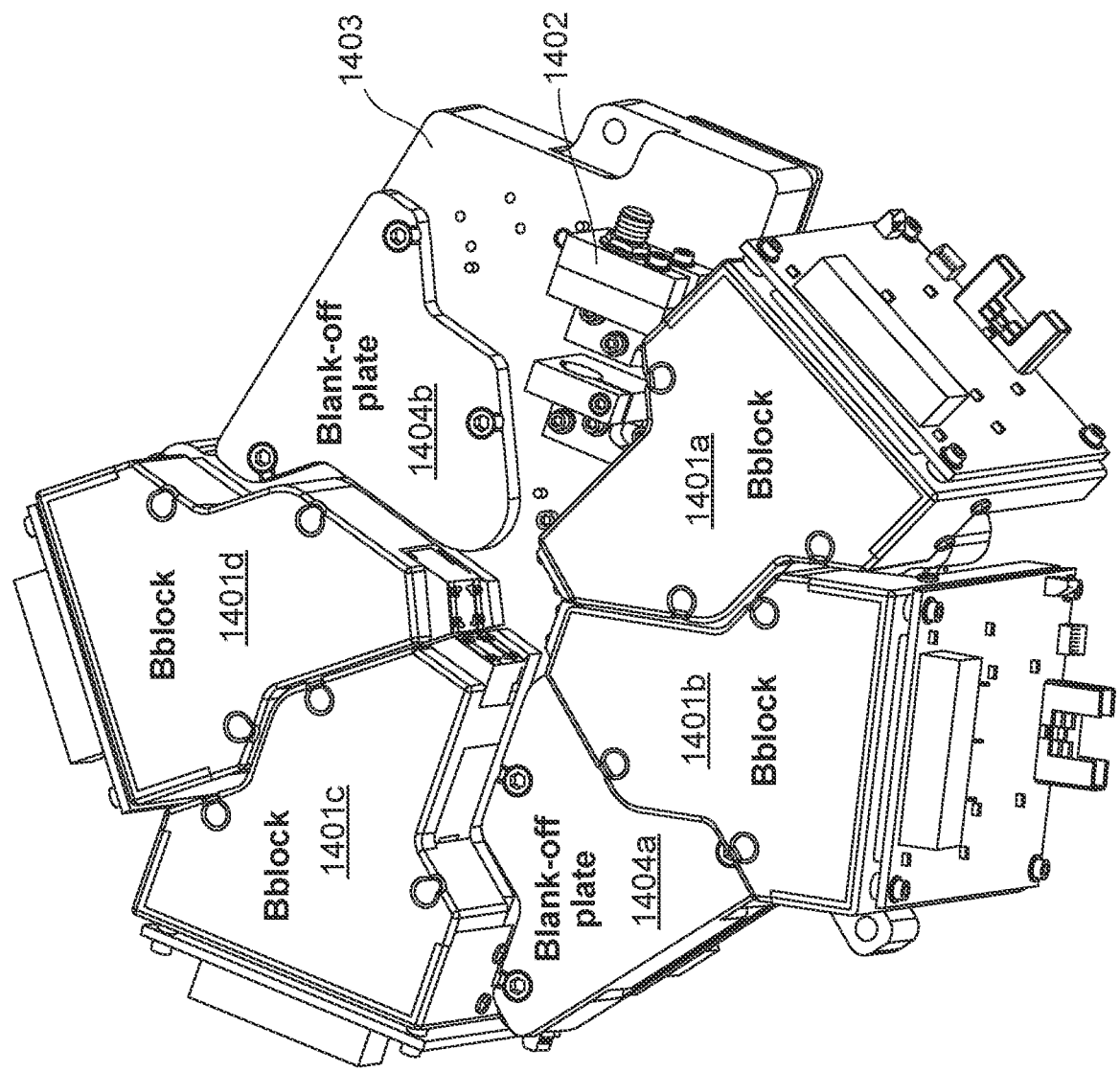
FIG. 14 depicts a baseplate having 4 light detection modules attached thereto.

FIG. 14 depicts a baseplate 1403 having 4 light detection modules 1401a-d and light receiver 1402 attached thereto. 2 recesses remain unused and are covered by blank-off plates 1404a and 1404b.

Methods of Analyzing a Sample

Aspects of the invention further include methods of analyzing a sample. Methods of interest include introducing a sample into a system having a light source and a light detection system, and flow cytometrically analyzing the sample. Light detection systems of interest in the subject methods include first and second light receivers in fixed positions relative to each other, a plurality of wavelength separators configured to pass light from the first and second light receivers having a predetermined spectral range, and a plurality of light detection modules. In embodiments, the first and second light receivers are configured to receive first and second beams of light, respectively. In addition, each light detection module is in optical communication with a wavelength separator and includes a plurality of photodetectors.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for characterized according to a variety of parameters, such as a phenotypic characteristic identified via the attachment of a particular fluorescent label to cells of interest. In some embodiments, the system is configured to deflect analyzed droplets that are determined to include a target cell. A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, in embodiments light from the irradiated sample is conveyed to a light detection system as described herein and measured by one or more photodetectors. In practicing the subject methods, light from the sample is conveyed to three or more wavelength separators that are each configured to pass light having a predetermined spectral range. The spectral ranges of light from each of the wavelength separators are conveyed to one or more light detection modules having optical components that are configured to convey light having a predetermined sub-spectral range to the photodetectors.

Light may be measured with the light detection systems continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the subject light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Methods of interest may further include employing particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Methods of Assembling a Light Detection System

Aspects of the invention additionally include methods of assembling a light detection system. Methods of interest include attaching the following elements to a baseplate: first and second light receivers in fixed positions relative to each other, a plurality of wavelength separators configured to pass light from the first and second light receivers having a predetermined spectral range, and a plurality of light detection modules. Baseplates of interest for the subject methods include first and second stages for mounting the first and second light receivers, a plurality of recesses for fixing the plurality of light detection modules in rigid alignment, and a heat dissipation opening positioned within each recess at a location proximal to a central point. Recesses of interest are arranged around the central point, e.g., in a polygonal configuration as described above. Accordingly, methods of the disclosure include attaching the first and second light receivers to the first and second stages of the baseplate, respectively. In addition, methods include affixing each light detection module within the plurality of light detection modules to a corresponding recess in the baseplate.

In embodiments, methods further include arranging the wavelength separators such that they convey light between each other. In some cases, methods may involve fine-tuning the position of each wavelength separator via an adjustment mechanism. In embodiments, the adjustment mechanism is configured to fine-tune the position of the wavelength separator by rotating around a dowel pin. In additional embodiments, the adjustment mechanism includes a flexure for fine-tuning the position of the wavelength separator in a vertical direction. The adjustment mechanism may, in such embodiments, include a set of screws for altering the conformation of the flexure.

In some versions, methods of assembling a light detection system further include attaching first and second optical collection components to the first and second light receivers, respectively. Optical collection components of interest include, for example, fiber optics (e.g., fiber optic relay bundles). Methods may include connecting the optical collection components to couplers of the first and second light receivers.

Computer Controlled Systems

Aspects of the present disclosure further include computer-controlled systems, where the systems include one or more computers for complete automation or partial automation. In some embodiments, systems include a computer having a non-transitory computer readable storage medium with a computer program stored thereon, where the computer program when loaded on the computer includes instructions for analyzing data from one or more light detection systems described above.

In embodiments, the system includes an input module, a processing module, and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smart-phone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

Figure 15:
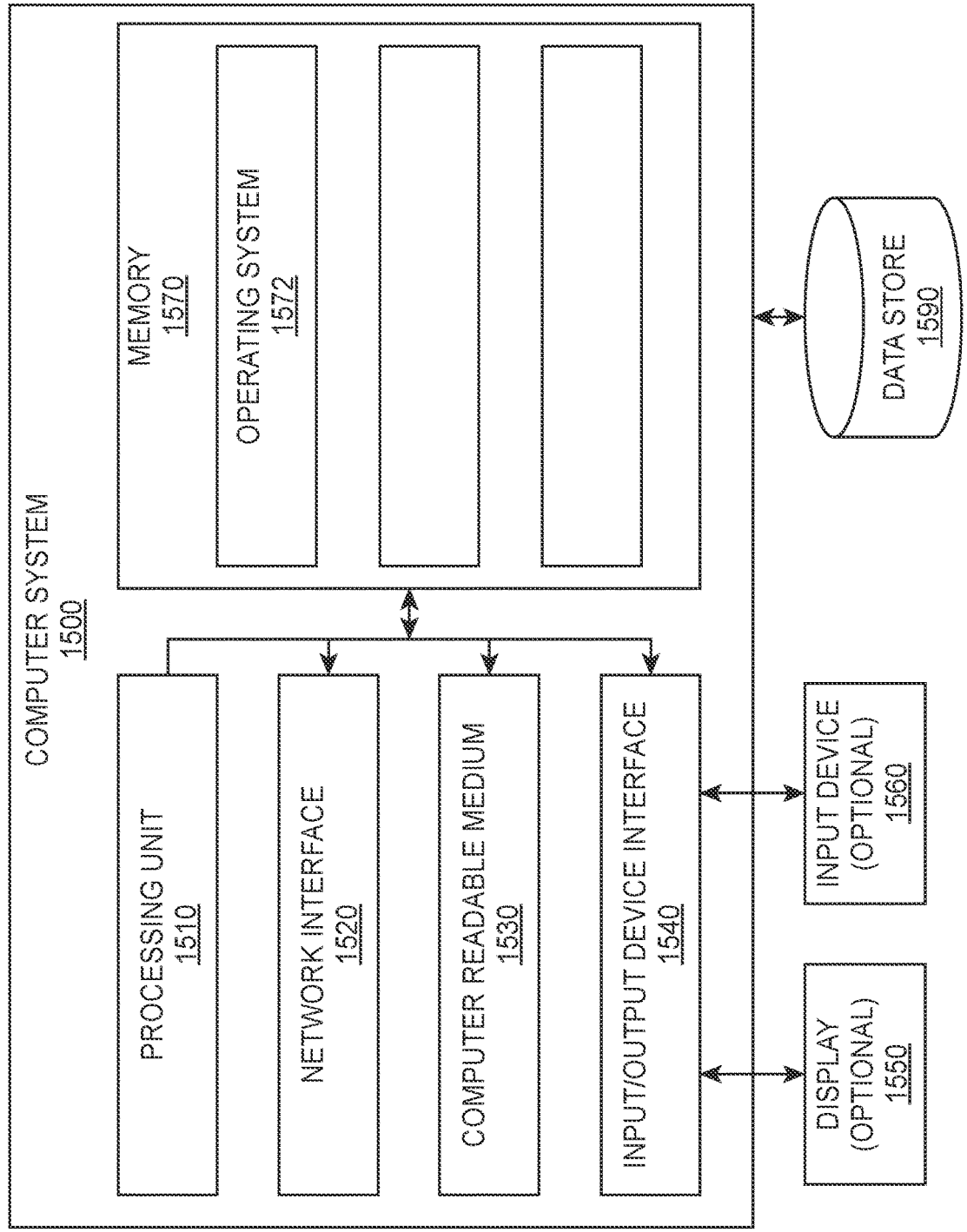
FIG. 15 depicts a block diagram of a computing system according to certain embodiments.

FIG. 15 depicts a general architecture of an example computing device 1500 according to certain embodiments. The general architecture of the computing device 1500 depicted in FIG. 15 includes an arrangement of computer hardware and software components. It is not necessary, however, that all of these generally conventional elements be shown in order to provide an enabling disclosure. As illustrated, the computing device 1500 includes a processing unit 1510, a network interface 1520, a computer readable medium drive 1530, an input/output device interface 1540, a display 1550, and an input device 1560, all of which may communicate with one another by way of a communication bus. The network interface 1520 may provide connectivity to one or more networks or computing systems. The processing unit 1510 may thus receive information and instructions from other computing systems or services via a network. The processing unit 1510 may also communicate to and from memory 1570 and further provide output information for an optional display 1550 via the input/output device interface 1540. For example, an analysis software (e.g., data analysis software or program such as FlowJo®) stored as executable instructions in the non-transitory memory of the analysis system can display the flow cytometry event data to a user. The input/output device interface 1540 may also accept input from the optional input device 1560, such as a keyboard, mouse, digital pen, microphone, touch screen, gesture recognition system, voice recognition system, gamepad, accelerometer, gyroscope, or other input device.

The memory 1570 may contain computer program instructions (grouped as modules or components in some embodiments) that the processing unit 1510 executes in order to implement one or more embodiments. The memory

1570 generally includes RAM, ROM and/or other persistent, auxiliary or non-transitory computer-readable media. The memory 1570 may store an operating system 1572 that provides computer program instructions for use by the processing unit 1510 in the general administration and operation of the computing device 1500. Data may be stored in data storage device 1590. The memory 1570 may further include computer program instructions and other information for implementing aspects of the present disclosure.

Utility

The subject light detection systems find use where the characterization of a sample by optical properties, in particular where low levels of light are collected, is desired. In some embodiments, the systems and methods described herein find use in flow cytometry characterization of biological samples labelled with fluorescent tags. In other embodiments, the systems and methods find use in spectroscopy of transmitted or scattered light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. Embodiments of the present disclosure find use where enhancing the effectiveness of emission measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting.

The present disclosure also finds use in applications where cells prepared from a biological sample may be desired for research, laboratory testing or for use in therapy. In some embodiments, the subject methods and devices may facilitate the obtaining of individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the invention further include kits, where kits include three or more wavelength separators, a plurality of photodetectors and one or more optical components (e.g., dichroic mirrors, beam splitters, collimating lenses, etc.). In some embodiments, kits include a substrate for co-mounting a wavelength separator with an optical component and a photodetector. In certain embodiments, kits include one or more fasteners for assembling together components of the subject light detection systems. Kits may also include an optical collection component, such as fiber optics (e.g., fiber optics relay bundle) or components for a free-space relay system. In some instances, kits further include one or more photodetectors, such as photomultiplier tubes (e.g., metal package photomultiplier tubes). Embodiments of the kits also include first and second light receivers as well as one or more baseplates (e.g., such as those described above).

In some embodiments, kits include 2 or more of the components of the light detection systems disclosed herein, such as 3 or more and including 5 or more. In some instances, the kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired.

The various assay components of the kits may be present in separate containers, or some or all of them may be pre-combined. For example, in some instances, one or more components of the kit are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A light detection system comprising:
   first and second light receivers in fixed positions relative to each other, wherein the first and second light receivers are configured to receive first and second beams of light, respectively;
   a plurality of wavelength separators configured to pass light from the first and second light receivers having a predetermined spectral range;
   a plurality of light detection modules, wherein each light detection module is in optical communication with a wavelength separator of the plurality of wavelength separators and comprises a plurality of photodetectors; and
   a baseplate for mounting the light detection system, the baseplate comprising:
      first and second stages for mounting the first and second light receivers, respectively, wherein the first and second stages are arranged around a central point; and
      one or more heat dissipation openings positioned at a location proximal to the central point.

2. The light detection system according to claim 1, wherein the first and second light receivers each comprise a coupler for operably attaching an optical collection component.

3. The light detection system according to claim 2, further comprising first and second optical collection components operably attached to the couplers for propagating light to the first and second light receivers, respectively.

4. The light detection system according to claim 3, wherein the first and second optical collection components comprise fiber optics.

5. The light detection system according to claim 4, wherein the first and second optical collection components comprise fiber optic relay bundles.

6. The light detection system according to claim 3, further comprising:
   a flow cell; and
   a light source for irradiating an interrogation point of the flow cell;
   wherein the first and second optical collection components are configured to receive the first and second beams of light from the interrogation point and transmit the first and second beams of light to the first and second light receivers, respectively.

7. The light detection system according to claim 1, wherein the first and second light receivers each comprise a beam adjuster.

8. The light detection system according to claim 7, wherein the beam adjuster is a lens.

9. The light detection system according to claim 1, wherein the wavelength separators are configured to convey light between each other.

10. The light detection system according to claim 1, wherein the wavelength separators are comprised of dichroic mirrors.

11. The light detection system according to claim 1, wherein the first beam of light is conveyed by a first subset of wavelength separators and the second beam of light is conveyed by a second subset of wavelength separators.

12. The light detection system according to claim 1, wherein each wavelength separator comprises an adjustment mechanism configured to fine-tune the position of the wavelength separator.

13. The light detection system according to claim 12, wherein the adjustment mechanism is configured to fine-tune the position of the wavelength separator by rotating around a dowel pin.

14. The light detection system according to claim 1, wherein the distance separating adjacent wavelength separators in the plurality of wavelength separators is constant.

15. The light detection system according to claim 1, wherein the light detection modules are arranged in a polygonal configuration.

16. The light detection system according to claim 1, wherein the plurality of photodetectors comprises avalanche photodiodes.

17. The light detection system according to claim 1, wherein the plurality of photodetectors comprises photomultiplier tubes.

18. The light detection system according to claim 1, wherein each light detection module further comprises a plurality of optical components configured to convey light having a predetermined sub-spectral range for detection.

19. The light detection system according to claim 1, further comprising
   a plurality of recesses for fixing the plurality of light detection modules in rigid alignment, wherein the recesses are arranged around the central point and each comprise a heat dissipation opening positioned within each recess at a location proximal to the central point.

20. The light detection system according to claim 19, wherein the baseplate further comprises a cutout gaseously connected to each heat dissipation opening, wherein the cutout is configured to direct heat pooled from each light detection module away from the light detection system.

* * * * *